United States Patent
Silbermintz et al.

(10) Patent No.: US 10,795,604 B2
(45) Date of Patent: Oct. 6, 2020

(54) REPORTING AVAILABLE PHYSICAL STORAGE SPACE OF NON-VOLATILE MEMORY ARRAY

(71) Applicant: Western Digital Technologies, Inc., San Jose, CA (US)

(72) Inventors: Michal Silbermintz, Tel Mond (IL); David Haliva, Kfar Saba (IL); Gadi Vishne, Petach-Tikva (IL)

(73) Assignee: Western Digital Technologies, Inc., San Jose, CA (US)

(*) Notice: Subject to any disclaimer, the term of this patent is extended or adjusted under 35 U.S.C. 154(b) by 45 days.

(21) Appl. No.: 16/042,960

(22) Filed: Jul. 23, 2018

(65) Prior Publication Data

US 2020/0026457 A1    Jan. 23, 2020

(51) Int. Cl.
G06F 3/06    (2006.01)

(52) U.S. Cl.
CPC .......... *G06F 3/0653* (2013.01); *G06F 3/0604* (2013.01); *G06F 3/064* (2013.01); *G06F 3/0688* (2013.01)

(58) Field of Classification Search
None
See application file for complete search history.

(56) References Cited

U.S. PATENT DOCUMENTS

| | | |
|---|---|---|
| 9,201,784 B2 | 12/2015 | Nagai |
| 9,383,926 B2 | 7/2016 | Law |
| 9,710,377 B1 | 7/2017 | Kuzmin et al. |
| 9,727,454 B2 | 8/2017 | Kuzmin et al. |
| 2006/0031269 A1* | 2/2006 | Gislason ............... G06F 16/10 |
| 2007/0283428 A1 | 12/2007 | Ma et al. |
| 2008/0282045 A1* | 11/2008 | Biswas ............... G06F 12/0246 711/159 |
| 2009/0198952 A1* | 8/2009 | Khmelnitsky ...... G06F 12/0246 711/206 |
| 2009/0271564 A1* | 10/2009 | Sugimoto ........... G06F 11/0793 711/103 |

(Continued)

FOREIGN PATENT DOCUMENTS

| | | |
|---|---|---|
| CN | 101645310 A | 2/2010 |
| WO | 2017062117 A1 | 4/2017 |

OTHER PUBLICATIONS

Bu et al "Schemes for Extending the Lifetime of SSD" TELKOMNIKA Indonesian Journal of Electrical Engineering; ISSN: 2302-4046; Sep. 2014; pp. 6940-6945; vol. 12, No. 9; Institute of Advanced Engineering and Science; People's Republic of China; https://pdfs.semanticscholar.org/b7db/7384c9e195098771ba4ea889eeeee511cbf0.pdf.

*Primary Examiner* — Kevin Verbrugge
(74) *Attorney, Agent, or Firm* — Loza & Loza, LLP; Gabriel Fitch

(57) ABSTRACT

The disclosure relates in some aspects to reporting the amount of available physical storage space of a non-volatile memory (NVM) array. A device including an NVM array may send reports regarding the amount of available physical storage space in the non-volatile memory device to a host device or some other suitable apparatus. The amount of available physical storage space takes into account whether any of the physical address blocks of the NVM array have been designated as worn-out. The host device (or other suitable apparatus) may send a report to a user when the amount of available physical storage space is relatively low.

24 Claims, 14 Drawing Sheets

(56) References Cited

U.S. PATENT DOCUMENTS

| | | | |
|---|---|---|---|
| 2010/0082890 A1* | 4/2010 | Heo | G06F 12/0246 |
| | | | 711/103 |
| 2010/0211820 A1* | 8/2010 | Kim | G06F 12/0246 |
| | | | 714/5.1 |
| 2011/0197034 A1* | 8/2011 | Nakanishi | G06F 12/0246 |
| | | | 711/154 |
| 2014/0359198 A1 | 12/2014 | Zaltsman et al. | |
| 2018/0173434 A1* | 6/2018 | Li | G06F 13/4068 |

* cited by examiner

REPORTING AVAILABLE PHYSICAL STORAGE SPACE OF NON-VOLATILE MEMORY ARRAY

FIELD

The disclosure relates, in some embodiments, to non-volatile memory (NVM) devices and memory controllers and host devices for use therewith. More specifically, but not exclusively, the disclosure relates to reporting the amount of available physical storage space of an NVM array.

INTRODUCTION

Solid state data storage devices (hereafter referred to as SSD storage devices) incorporating non-volatile memories (NVMs), such as flash NAND memories, are replacing or supplementing conventional rotating hard disk drives for mass storage in many consumer or industrial electronics and computers. In a typical SSD storage device-based product (e.g., a solid state drive), a host device includes or communicates with an NVM device controller that in turn controls access to one or more NVM devices (e.g., NVM arrays). For example, the host device may issue a write command and a read command to an NVM device controller to write data to and read data from an SSD storage device.

As NVM devices have a limited storage capacity, an NVM device of an SSD storage device may eventually fill up with data. Such a scenario may be dealt with by simply preventing further writes to the SSD storage device or by overwriting stored data. For example, in some NVM storage architectures, an SSD storage device is configured to switch to a read-only state when the NVM device of the SSD storage device is full due to previous writes to the SSD storage device. It would be advantageous to better manage an SSD storage device as its NVM device becomes full.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a data storage apparatus that includes a non-volatile memory array, an interface, and a processor coupled to the non-volatile memory array and the interface. In one example, the processor is configured to: determine an amount of available physical storage space in the non-volatile memory array, wherein the amount of available physical storage space is based on a total amount of physical storage space, a first amount of storage space comprising used blocks, and a second amount of storage space comprising worn-out blocks, generate an indication based on the amount of available physical storage space, and send the indication to another apparatus via the interface.

One embodiment of the disclosure provides a data storage method. In one example, the method includes: determining an amount of available physical storage space in a non-volatile memory array, wherein the amount of available physical storage space is based on a total amount of physical storage space, a first amount of storage space comprising used blocks, and a second amount of storage space comprising worn-out blocks, and a third amount of storage space comprising reserved blocks; generating an indication based on the amount of available physical storage space, and sending the indication to a host device.

One embodiment of the disclosure provides a data storage apparatus. In one example, the apparatus includes: means for determining an amount of available physical storage space in a non-volatile memory array, wherein the amount of available physical storage space is based on a total amount of physical storage space, a first amount of storage space comprising used blocks, and a second amount of storage space comprising worn-out blocks; means for generating a report based on the amount of available physical storage space; and means for sending the report.

One embodiment of the disclosure provides a non-transitory computer-readable medium storing computer-executable code for storing data. In one example, the computer-readable medium includes code to: determine an amount of available physical storage space in a non-volatile memory array, wherein the amount of available physical storage space is based on a total amount of physical storage space, a first amount of storage space comprising used blocks, and a second amount of storage space comprising worn-out blocks; generate an indication based on the amount of available physical storage space; and send the indication to another apparatus.

One embodiment of the disclosure provides an apparatus for accessing a non-volatile memory device that includes a device interface to the non-volatile memory device, a host interface, and a processor coupled to the device interface and the host interface. In one example, the processor is configured to: receive, via the device interface, an indication of an amount of available physical storage space in the non-volatile memory device, wherein the amount of available physical storage space is based on a total amount of physical storage space, a first amount of storage space comprising used blocks, and a second amount of storage space comprising worn-out blocks, generate a message based on the indication, and output the message via the user interface.

One embodiment of the disclosure provides a method of controlling a non-volatile memory device. In one example, the method includes: receiving an indication of an amount of available physical storage space in the non-volatile memory device, wherein the amount of available physical storage space is based on a total amount of physical storage space, a first amount of storage space comprising used blocks, a second amount of storage space comprising worn-out blocks, and a third amount of storage space comprising reserved blocks; generating an alert message based on the indication; and sending the alert message to a user.

One embodiment of the disclosure provides an apparatus for controlling a non-volatile memory device. In one example, the apparatus includes: means for receiving an indication of an amount of available physical storage space in the non-volatile memory device, wherein the amount of available physical storage space is based on a total amount of physical storage space, a first amount of storage space comprising used blocks, and a second amount of storage space comprising worn-out blocks; means for generating an alert message based on the indication; and means for sending the alert message.

One embodiment of the disclosure provides a non-transitory computer-readable medium storing computer-executable code for controlling a non-volatile memory device. In one example, the computer-readable medium includes code to: receive an indication of an amount of available physical storage space in the non-volatile memory device, wherein the amount of available physical storage space is based on a total amount of physical storage space, a first amount of storage space comprising used blocks, and a second amount of storage space comprising worn-out blocks; generate a message based on the indication; and output the message.

One embodiment of the disclosure provides a data storage apparatus that includes a non-volatile memory array, and interface, and a processor coupled to the non-volatile memory array and the interface. In one example, the processor is configured to: receive, via the interface, a write command associated with bad block detection, wherein the write command includes a logical block address, determine whether the logical block address is mapped to a block of the non-volatile memory array that is designated as worn-out, and send an indication of the determination via the interface.

One embodiment of the disclosure provides a data storage method. In one example, the method includes: receiving a write command associated with bad block detection, wherein the write command includes a logical block address; determining whether the logical block address is mapped to a block of the non-volatile memory array that is designated as worn-out; and sending an indication of the determination to a host device.

One embodiment of the disclosure provides a data storage apparatus. In one example, the apparatus includes: means for receiving a write command associated with bad block detection, wherein the write command includes a logical block address; means for determining whether the logical block address is mapped to a block of the non-volatile memory array that is designated as worn-out; and means for sending an indication of the determination.

One embodiment of the disclosure provides a non-transitory computer-readable medium storing computer-executable code for storing data. In one example, the computer-readable medium includes code to: receive a write command associated with bad block detection, wherein the write command includes a logical block address; determine whether the logical block address is mapped to a block of the non-volatile memory array that is designated as worn-out; and send an indication of the determination.

One embodiment of the disclosure provides an apparatus for accessing a non-volatile memory device, wherein the apparatus includes a device interface to the non-volatile memory device and a processor coupled to the device interface. In one example, the processor is configured to: send, via the device interface, a write command for bad block detection, wherein the write command includes a logical block address, receive, via the device interface, a response to the write command, and update a data set based on the response, wherein the data set indicates a quantity of logical block addresses that are mapped to worn-out physical block addresses of the non-volatile memory device.

One embodiment of the disclosure provides a method of controlling a non-volatile memory device. In one example, the method includes: sending a write command for bad block detection to the non-volatile memory device, wherein the write command includes a logical block address; receiving a response to the write command; and updating a data set based on the response, wherein the data set indicates a quantity of logical block addresses that are mapped to worn-out physical block addresses of the non-volatile memory device.

One embodiment of the disclosure provides an apparatus for controlling a non-volatile memory device. In one example, the apparatus includes: means for sending a write command to the non-volatile memory device, wherein the write command includes a logical block address; means for receiving a response to the write command; and means for updating a data set based on the response, wherein the data set indicates a quantity of logical block addresses that are mapped to worn-out physical block addresses of the non-volatile memory device.

One embodiment of the disclosure provides a non-transitory computer-readable medium storing computer-executable code for controlling a non-volatile memory device. In one example, the computer-readable medium includes code to: send a write command for bad block detection, wherein the write command includes a logical block address; receive a response to the write command; and update a data set based on the response, wherein the data set indicates a quantity of logical block addresses that are mapped to worn-out physical block addresses of the non-volatile memory device.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The disclosure relates in some aspects to various apparatuses, systems, methods, and media for reporting the amount of available physical data storage in an NVM device and actions taken based on the reporting. For example, an SSD storage device may keep track of the number of used blocks, reserved blocks, and bad blocks of the NVM device to determine the actual amount of physical data storage that is available for subsequent writes to the NVM device. The SSD storage device will then send a report to a host device so that the host device can take appropriate action based on the report. For example, the host device may manage the data stored in the SSD storage device to free up storage space, if needed. As another example, the host device may send a report to a user to enable the user to take action based on the report, if desired.

For purposes of illustration, various aspects of the disclosure will be described in the context of a memory system that includes NAND memory technology. A NAND device may be referred to herein as a NAND Flash memory, a NAND memory device, a NAND flash, or a NAND. Generally speaking, a NAND device is a non-volatile memory having high storage density, fast access time, low power requirements in operation and advantageous shock resistance, compared to more conventional memory platforms. Raw NAND devices may be equipped (e.g., configured) with a serial interface such as Open NAND Flash Interface (ONFi), Common Flash Memory Interface (CFI), and the like. NAND devices may be configured as discrete memory chips or packaged with a controller to form a secure digital (SD) memory card, Multi Media Card (MMC), or a solid state disk. A NAND device may be configured with a single flash die, or a plurality of dies. In addition to memory cells, a NAND device may include other components, such as control/address logic components, I/O components, and data register components. It should be appreciated that the teachings herein are also applicable to other forms of memory (e.g., NVM other than NAND devices).

Example Memory System

Figure 1:
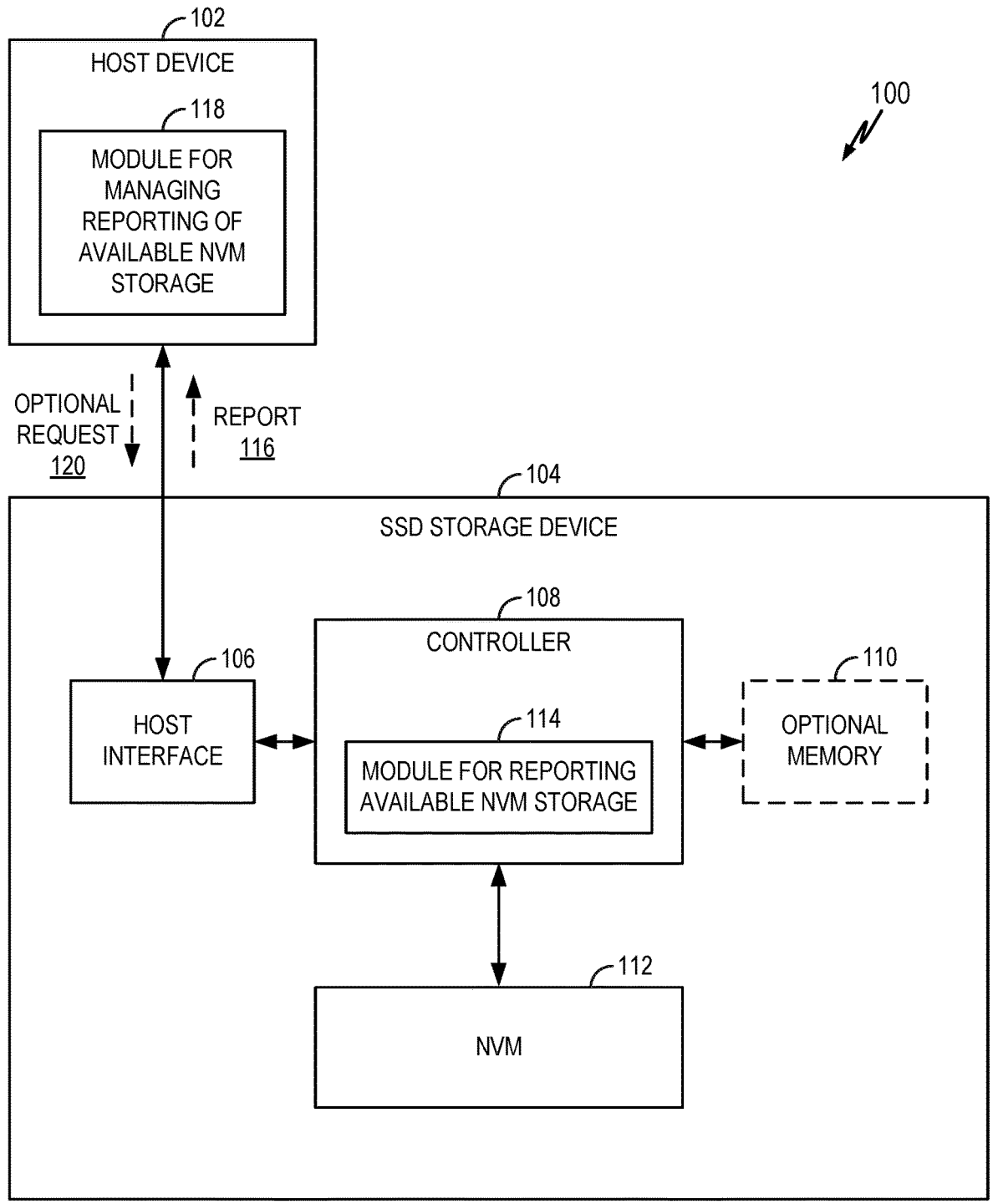
FIG. 1 illustrates an example memory system including a solid state data storage device (e.g., a solid state drive) configured in accordance with one or more aspects of the disclosure.

FIG. 1 illustrates an embodiment of a memory system 100 that includes a host device 102 and an SSD storage device 104 communicatively coupled to the host device 102. The host device (e.g., a host computer) 102 provides commands to the SSD storage device 104 for transferring data between the host device 102 and the SSD storage device 104. For example, the host device 102 may provide a write command to the SSD storage device 104 for writing data to the SSD storage device 104 or a read command to the SSD storage device 104 for reading data from the SSD storage device 104. The host device 102 may be any system or device having a need for data storage or retrieval and a compatible interface for communicating with the SSD storage device 104. For example, the host device 102 may a computing device, a personal computer, a portable computer, or workstation, a server, a personal digital assistant, a digital camera, a digital phone, or the like.

The SSD storage device 104 includes a host interface 106, a controller 108, an optional memory 110, and a non-volatile memory (NVM) 112. The host interface 106 is coupled to the controller 108 and facilitates communication between the host device 102 and the controller 108. Additionally, the controller 108 is coupled to the memory 110 and the NVM 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) interface, a Small Computer System Interface (SCSI), an IEEE 1394 (Firewire) interface, or the like. In some embodiments, the host device 102 includes the SSD storage device 104 (e.g., the host device 102 and the SSD storage device 104 are implemented as a single component). In other embodiments, the SSD storage device 104 is remote with respect to the host device 102 or is contained in a remote computing system coupled in communication with the host device 102. For example, the host device 102 may communicate with the SSD storage device 104 through a wireless communication link.

The controller 108 controls operation of the SSD storage device 104. In various embodiments, the controller 108 receives commands from the host device 102 through the host interface 106 and performs the commands to transfer data between the host device 102 and the NVM 112. In addition, the controller 108 performs internal operations such as garbage collection operations, data integrity operations, and wear leveling operations. The controller 108 may include any type of processing device, such as a microprocessor, a microcontroller, an embedded controller, a logic circuit, software, firmware, or the like, for controlling operation of the SSD storage device 104.

In some embodiments, some or all of the functions described herein as being performed by the controller 108 may instead be performed by another element of the SSD storage device 104. For example, the SSD storage device 104 may include a microprocessor, a microcontroller, an embedded controller, a logic circuit, software, firmware, or any kind of processing device, for performing one or more of the functions described herein as being performed by the controller 108. In some embodiments, one or more of the functions described herein as being performed by the controller 108 are instead performed by the host device 102. In some embodiments, some or all of the functions described herein as being performed by the controller 108 may instead be performed by another element such as a controller in a hybrid drive including both non-volatile memory elements and magnetic storage elements.

The memory 110 may be any memory, computing device, or system capable of storing data. For example, the memory 110 may be a random-access memory (RAM), a dynamic random-access memory (DRAM), a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the controller 108 uses the memory 110, or a portion thereof, to store data during the transfer of data between the host device 102 and the NVM 112. For example, the memory 110 or a portion of the memory 110 may be a cache memory.

The controller 108 includes a module (e.g., hardware and/or software) for reporting available NVM storage 114. The module for reporting available NVM storage 114 determines the available physical storage space in the NVM 112 (e.g., periodically and/or in response to a request). For example, the module for reporting available NVM storage 114 may keep track of the number of used blocks, reserved blocks, and bad blocks of the NVM 112 to determine the actual amount of physical data storage that is available for subsequent writes to the NVM 112. Here, a reserved block may include, for example, a block that controller 104 needs for copying data from one NVM block to another (e.g., during background operations such as garbage collection operations)

The module for reporting available NVM storage 114 then sends a report 116 to the host device 102. For example, after determining the current amount of available physical storage space in the NVM 112, the module for reporting available NVM storage 114 may send a report indicating, for example, the current amount of available physical storage space and/or that the amount of available physical storage space is below a threshold level.

The host device 102 includes a module (e.g., hardware and/or software) for managing reporting of available NVM storage 118. In some cases, the module for managing reporting of available NVM storage 118 may sent a request 120 for a report. Alternatively, or in addition, the SSD storage device 104 may autonomously sent reports (e.g., periodically). In either case, the module for managing reporting of available NVM storage 118 may take action in the event the report indicates, for example, that the available physical storage space on the NVM 112 is low. For example, the module for managing reporting of available NVM storage 118 may send a report to a user (e.g., the user may choose to delete files on the SSD storage device 104). As another example, the module for managing reporting of available NVM storage 118 may manage the SSD storage device 104 to free up storage space. As yet another example, the module for managing reporting of available NVM storage 118 may manage writes issued to the SSD storage device 104 to ensure that the amount of data subsequently written to the SSD storage device 104 does not exceed the available physical storage space.

Example LBA Mapping

Figure 2:
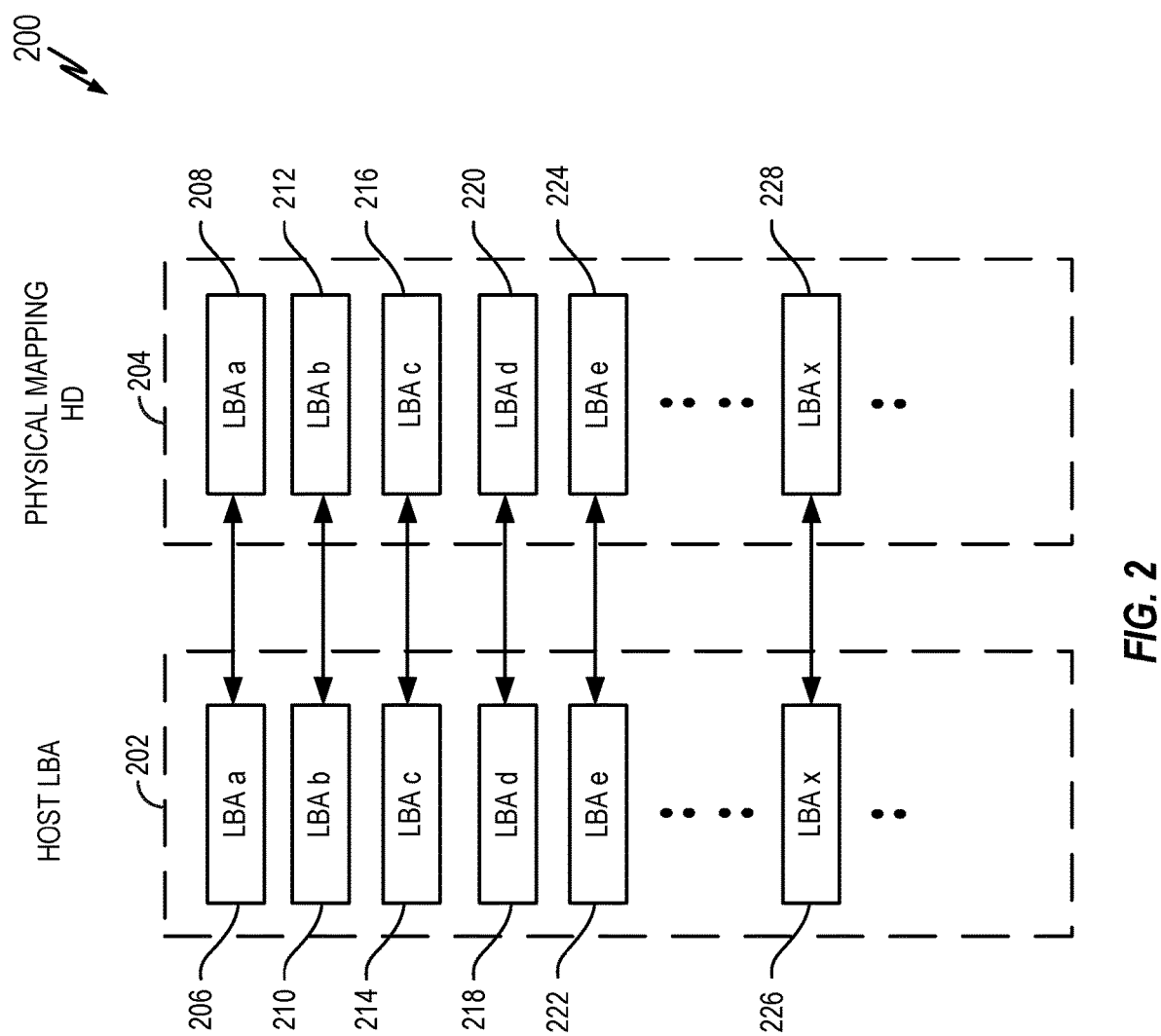
FIG. 2 illustrates an example of a logical block address mapping for a magnetic storage device.

Conventionally, a host device keeps track of the logical memory address space (logical block address range) of a storage device. Thus, a host device can present a corresponding indication to a user (e.g., indicting how much of the total logical block address range is occupied at the current time). For example, FIG. 2 illustrates an example of a mapping 200 (e.g., a hard mapping) for a magnetic disc drive where a set of logical block addresses 202 is mapped to a set of physical sector addresses 204. Specifically, a first logical block address (LBA a) 206 is mapped to a first physical sector address 208, a second logical block address 210 is mapped to a second physical sector address 212, a third logical block address 214 is mapped to a third physical sector address 216, a fourth logical block address 218 is mapped to a fourth physical sector address 220, a fifth logical block address 222 is mapped to a fifth physical sector address 224, a sixth logical block address 226 is mapped to a sixth physical sector address 228, and so on. At a given point in time, one or more of the logical block addresses are used to store data (e.g., logical block addresses 206, 210, 214, and 226).

In the event a physical sector of a magnetic disc drive fails, the drive can simply make a record that the sector is bad. For example, the sectors for physical sector addresses 212 and 216 may subsequently fail. In this case, after reusing the bad logical block addresses (e.g., logical block addresses 210 and 214), a host device may maintain pointers to these bad logical block addresses. Thus, for a magnetic disc drive, the logical occupancy status is the same as the physical occupancy status.

Use of an LBA-based indication may be misleading for other types of storage devices, however. For example, a host device does not know how much physical memory is actually available in a flash-based storage device. As a specific example, for a flash-based storage device, the indication may be that 75% of the logical block addresses range is full. In actuality, however, 24% of the remaining blocks may be worn-out such that the effective capacity status is 99% full. In this case, a host device's subsequent writes of user data to the flash device may cause the flash device to enter a read-only mode due to the flash device not having a sufficient number of available good blocks. Thus, in the above scenario, a host device does not know whether its next write operation will cause the flash device to transition to a read-only mode.

Figure 3:
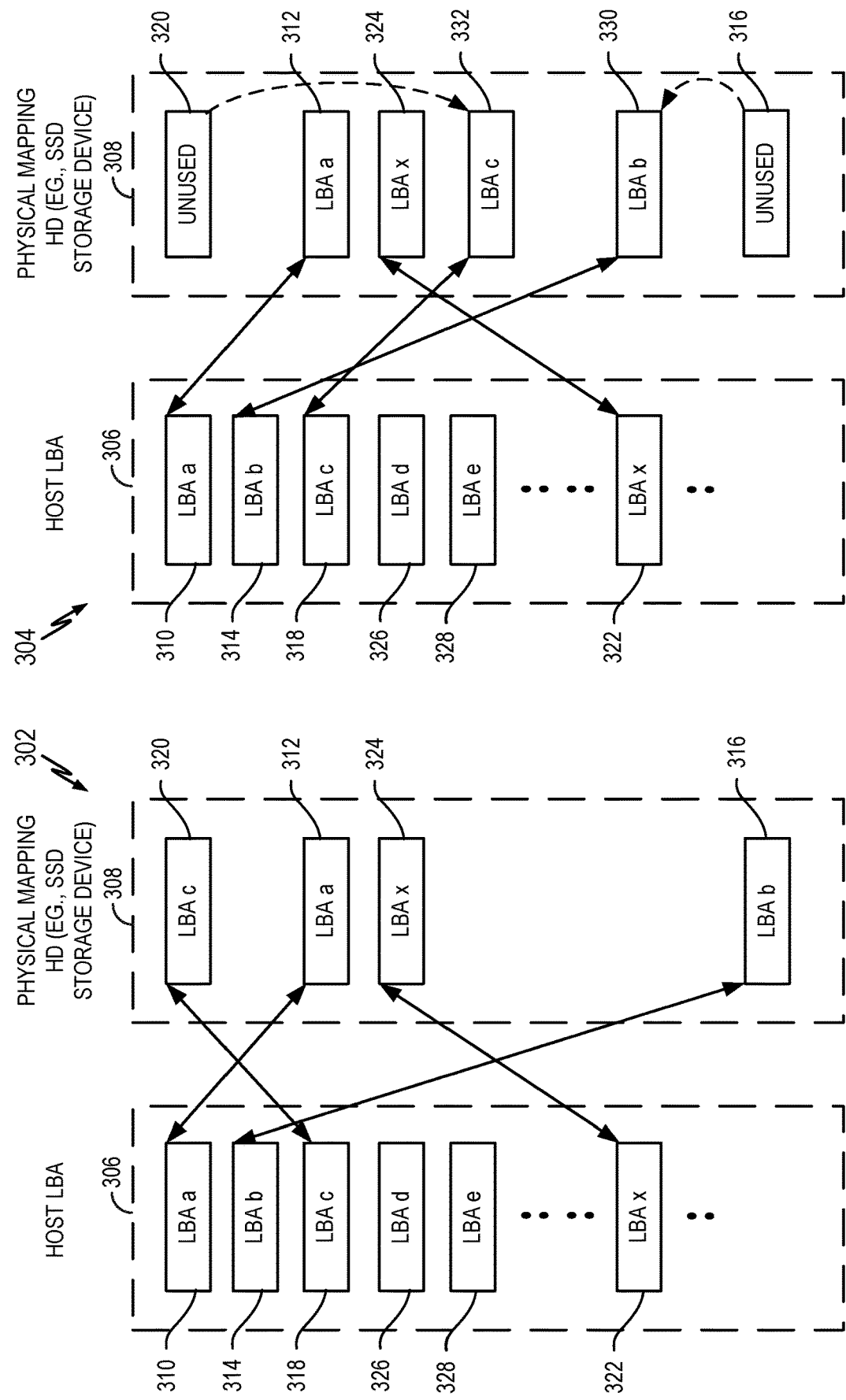
FIG. 3 illustrates an example of a logical block address mapping for a non-volatile memory device.

FIG. 3 illustrates an example of a first mapping 302 and second mapping 304 for a solid state drive or some other similar device. The first mapping 302 and the second mapping 304 are dynamic mappings, in contrast with the hard mapping of FIG. 2. For example, each successive write to a particular logical block address may be mapped to a different physical block address (e.g., to distribute the wear evenly throughout the blocks and/or because the blocks of the NVM array need to be erased before they can be rewritten).

In the first mapping 302, a set of logical block addresses 306 is mapped to a set of physical block addresses 308. Specifically, a first logical block address (LBA a) 310 is mapped to a first physical block address 312, a second logical block address 314 is mapped to a second physical block address 316, a third logical block address 318 is mapped to a third physical block address 320, and a fourth logical block address 322 is mapped to a fourth physical block address 324. In this dynamic mapping approach, logical block addresses that are not currently being used to store data (e.g., a fifth logical block address 326 and a sixth logical block address 328) are not mapped to a physical block address.

In the event a physical block of a solid state drive fails, the drive can dynamically reroute the mapping so that a logical block address mapped to a physical block that has failed is remapped to a good physical block. For example, cells of each of the second physical blocks address 316 and the third physical block address 320 of the first mapping 302 may subsequently fail. In this case, the drive may remap the second logical block address 314 to a fifth physical block address 330 and remap the third logical block address 318 to a sixth physical block address 332. Thus, in the second mapping 302, the first logical block address 310 is mapped to the first physical block address 312, the second logical block address 314 is mapped to the fifth physical block address 3330, the third logical block address 318 is mapped to the sixth physical block address 332, and the fourth logical block address 322 is mapped to the fourth physical block address 324. The logical block addresses that are not currently being used to store data (e.g., the fifth logical block address 326 and the sixth logical block address 328) are not mapped to a physical block address, and the bad block addresses (e.g., the second physical blocks address 316 and the third physical block address 320) are left unused.

For the second mapping 302, after reusing the bad logical block addresses (e.g., the second logical block address 314 and the third logical block address 318), the host device does not know how many bad blocks exist in the drive or the location of those bad blocks. Thus, the host device may attempt to write to the drive when the drive does not have enough free space for the write data.

Example Available Data Storage Reporting

In view of the above issues with logical mapping, the disclosure relates in some aspects to various techniques for reporting the available physical data storage of an SSD storage device. By reporting the amount of physical data storage that is actually available for use for future write operations, a host device, a user, or some other entity may take appropriate action, as needed, to prevent the SSD storage device from needlessly being filled to capacity (and potentially causing the SSD storage device to switch to a read-only mode of operation).

Figure 4:
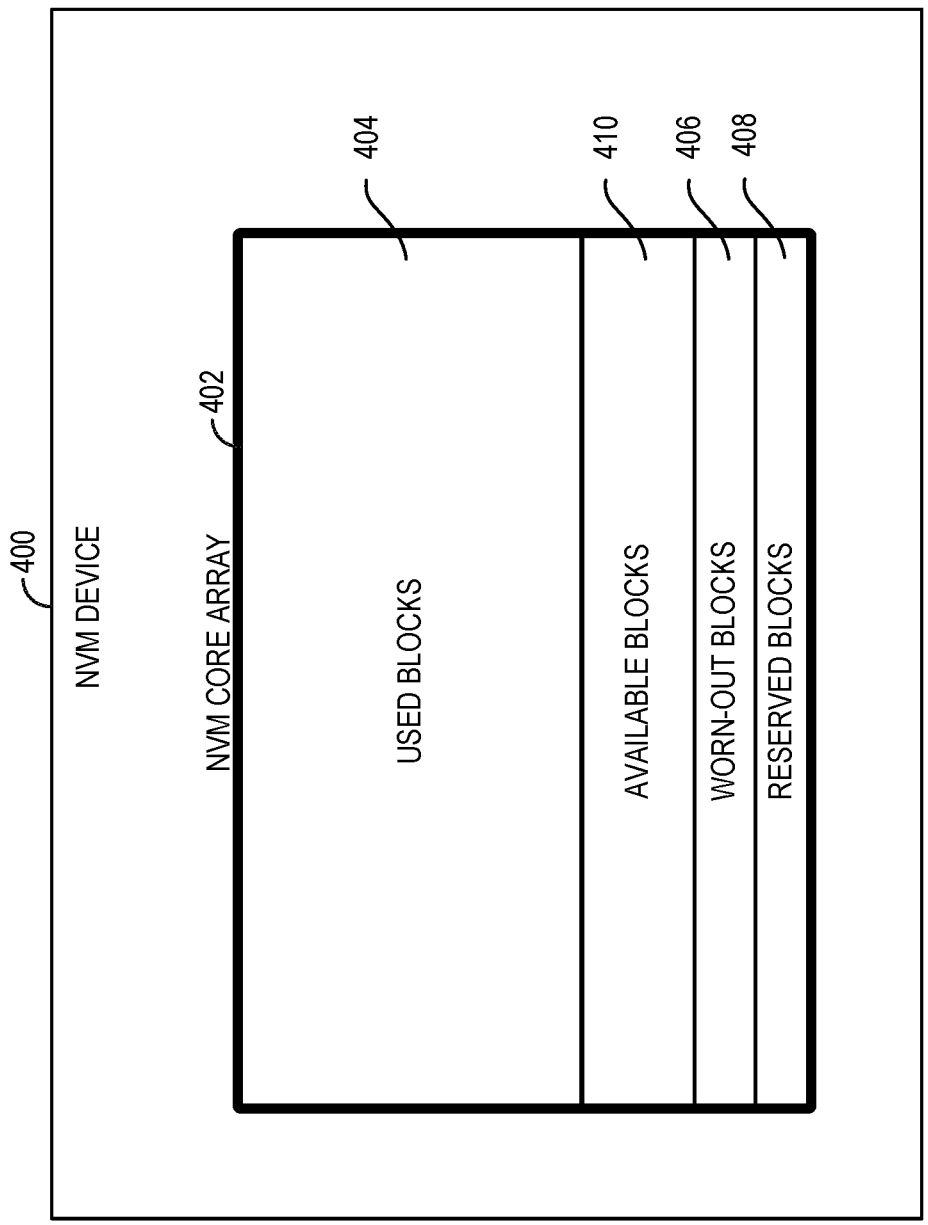
FIG. 4 illustrates an example of different designations in a non-volatile memory device in accordance with one or more aspects of the disclosure.

FIG. 4 illustrates an example of several types of data blocks in an NVM core array of an NVM device 400 (or other suitable memory device) that are referenced in the discussion that follows. To reduce the complexity of FIG. 4, only one set of data blocks are shown for each type. It should be appreciated, however, that blocks of the different types would typically be distributed throughout the NVM core array in a less contiguous manner Within the total physical storage space 402 of the NVM core array there may be blocks that are currently in use (used blocks 404), blocks that are worn-out (worn-out blocks 406), blocks that are reserved (reserved blocks 408), and blocks that are available to be written (available blocks 410).

The total physical storage space 402 corresponds to what is typically referred to as the size of the NVM core array. This may be characterized as a number of bytes, a number of blocks, or in some other manner.

The used blocks 404 may include blocks that are currently storing valid data and, hence, are not currently available to be written (e.g., by a host device). The used blocks 404 may include data stored in different layers of the NVM core array (e.g., layers based on single level cell (SLC) technology, multi-level cell (MLC) technology, etc.).

The worn-out blocks 406 may include blocks that have been designated at being worn-out (e.g., by a controller of an SSD storage device). This designation may be based on active testing (e.g., determining whether too many errors are occurring when programming and reading a block) or other techniques (e.g., determining whether a maximum number of program/erase cycles have been exceeded). A block may contain some cells that are worn-out and other cells that are not worn-out. In some implementations, a controller may be able to use some of the non-worn-out cells of a block that has worn-out cells. Thus, a block that includes worn-out and non-worn-out cells might or might not be designated as worn-out by the controller. Also, it is possible that some of the other blocks of the NVM core array (e.g., the used blocks 404, the reserved blocks 408, or the available blocks 410) may include cells that are worn-out but have not yet been designated as worn-out.

The reserved blocks 408 may include blocks that a controller or other component has reserved for internal operations. For example, a controller may reserve blocks for copying data, for background operations, etc.

The available blocks 410 include blocks that are available to be written (e.g., by a host device). In some aspects, the available blocks 410 may be defined as the number of "free" blocks that are also "good" blocks since the available blocks 410 can be defined to not include the used blocks 404, the worn-out blocks 406, and, optionally, the reserved blocks 408. In accordance with the teachings herein, an SSD storage device may report the amount of available blocks 410 to a host device or some other suitable device. From the above, it may be seen that the amount of available blocks may be based on a total amount of physical storage space, an amount of storage space including used blocks, and an amount of storage space including worn-out blocks (and, optionally, an amount of storage space including reserved blocks).

In a first aspect, the disclosure relates to monitoring the effective physical memory available to the host. This monitoring may be initiated by an SSD storage device (e.g., a controller of the device) periodically through the use of a timer, or in response to a trigger from a flash translation layer (FTL) that control the mapping of LBAs to physical block addresses, front end (FE) firmware (FW) that manages the connection of a host device, or some other component of the SSD storage device, or in response to a request from a host device or some other component of a memory system. Here, the SSD storage device may keep track of errors that occur during write and read operations to determine whether a particular block is worn-out (e.g., at least part of the block is worn out).

In a second aspect, the disclosure relates to determining whether the effective physical memory available to the host (e.g., the number of good blocks) is less than or equal to a threshold. This SSD storage device may receive this threshold from the host device, or the SSD storage device may be programmed with the threshold (e.g., during manufacturing), or the SSD storage device may be configured with the threshold in some other way.

In a third aspect, the disclosure relates to the SSD storage device sending a report to the host device (or some other suitable device). In some embodiments, the SSD storage device sends an indication of the amount of available physical storage space determined above. In some embodiments, the SSD storage device issues a warning if the amount of available physical storage space is less than or equal to the threshold discussed above.

In a fourth aspect, in addition to the available physical capacity indication, the SSD storage device may sent a measure of the total amount of data that has been written to the SSD storage device from the beginning of life (BOL).

This information may be used to complement the effective memory space available information sent to the host device.

In a fifth aspect, the disclosure relates to the SSD storage device (e.g., the controller of the device) monitoring the content of the command queues and issuing a message (e.g., a warning message) to the host device if the data in the command queues scheduled to be written to the flash device is more than the effective physical memory available (e.g., the number of available good blocks).

In a sixth aspect, the host device (or some other suitable device) presents to a user the physical capacity occupancy status along with the LBA range occupancy status. As discussed above, the physical capacity occupancy status may be higher than the LBA range occupancy status at some point in time.

In a seventh aspect, the host device, a user, or some other suitable entity may erase data on the SSD storage device and/or otherwise create more room on the SSD storage device in response to a report. In general, this a preferred mode of operation as opposed to blindly writing data to the SSD storage device which may cause the SSD storage device to go into the dead-end read-only mode. Thus, an SSD storage device may notify the host device in advance that the number of good blocks in the SSD storage device does not allow writing more data to the SSD storage device. The host device can therefore take this into account and not force the SSD storage device into read-only mode. Also, by reporting the status to a user, the user will be able to erase data and make more room on the drive, thereby preventing the SSD storage device from switching to the read-only mode.

In an eighth aspect, a memory system may use a custom write command to enable a host device (or some other suitable entity) to identify bad blocks (e.g., bad sectors). In this way, the host device may determine the number of bad blocks and/or specifically identify the bad blocks in a proactive way. Here, the host device repeatedly issues the write command to the SSD storage device (e.g., over a period of time, periodically, etc.), using a different logical block address with each write command. For each write command, the SSD storage device may respond with an indication of whether the logical block address is mapped to a bad physical block. For example, the SSD storage device may respond with a message (e.g., an error message) if a bad block is encountered. Alternatively, or in addition, the SSD storage device may respond with a message (e.g., an error message) if a bad block is not encountered. Thus, the host device may maintain a record of the number of bad blocks and/or a record of all of the logical block addresses that are mapped to bad blocks (e.g., similar to the procedure used for magnetic disc drives).

These aspects and other aspects of the disclosure will now be described in more detail in conjunction with FIGS. 3-8.

First Example Reporting Algorithm

Figure 5:
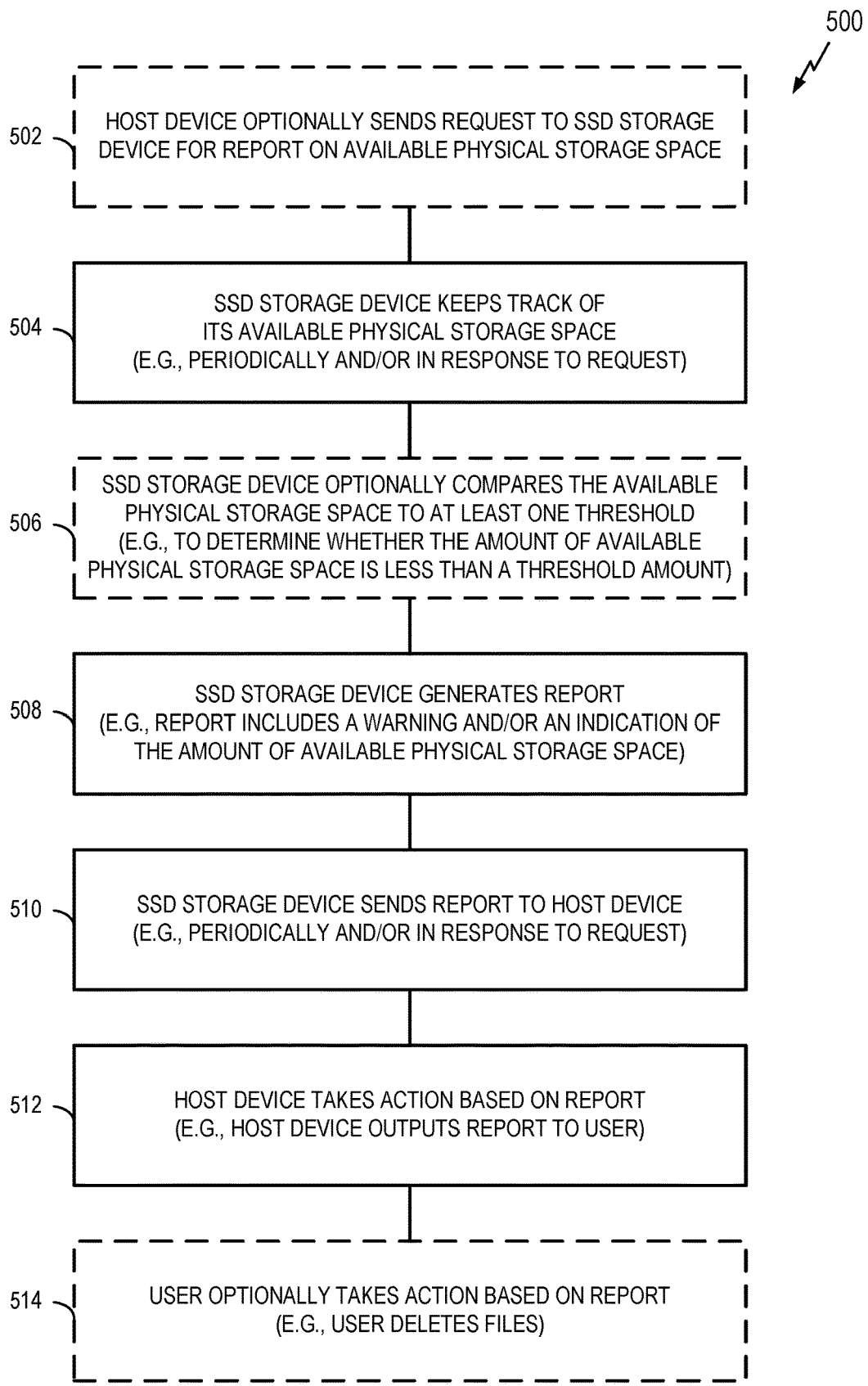
FIG. 5 illustrates an example of operations for reporting an amount of available physical storage space of a non-volatile memory device in accordance with one or more aspects of the disclosure.

FIG. 5 illustrates an embodiment of operations 500 that may be performed in conjunction with reporting an indication of available physical storage space in accordance with the teachings herein. The operations 500 may take place within one or more of an SSD storage device, a host device, an NVM device, or some other suitable apparatus or apparatuses. For example, one or more of these operations may be performed by the controller 108 (e.g., the module for reporting available NVM storage 114) of FIG. 1. As another example, one or more of these operations may be performed by the host device 102 (e.g., the module for managing reporting of available NVM storage 118) of FIG. 1.

At optional block 502, a host device (or other suitable apparatus) may send a request to an SSD storage device (or other suitable apparatus) for a report on available physical storage space.

At block 504, the SSD storage device (or other suitable apparatus) keeps track of its available physical storage space. This operation may be performed, for example, periodically and/or in response to the request of block 502.

At optional block 506, the SSD storage device may compare the available physical storage space to at least one threshold. For example, the SSD storage device may determine whether the amount of available physical storage space is less than a threshold amount.

At block 508, the SSD storage device generates a report based on the operations of block 504 and/or block 506. The report may include a warning (e.g., based on the comparison of block 506) and/or an indication of the amount of available physical storage space (e.g., based on the operations of block 504).

At block 510, the SSD storage device sends the report to the host device. This operation may be performed, for example, periodically, in response to the request of block 502, in response to the comparison of block 506, based on some other criterion, or any combination of the above criteria.

At block 512, the host device takes action based on the report. For example, upon receiving the report from the SSD storage device, the host device may output the report (or another report based on the received report) to a user.

At optional block 514, a user (or other suitable entity) may take action based on the report. For example, upon receiving the report from the host device, the user may take action to delete one or more files from the SSD storage device to increase the amount of available physical storage space.

The operations 500 will be repeated over time to provide up-to-date reports on the available physical storage space. In some aspects, a process in accordance with the teachings herein may include any combination of the above operations.

Second Example Reporting Algorithm

Figure 6:
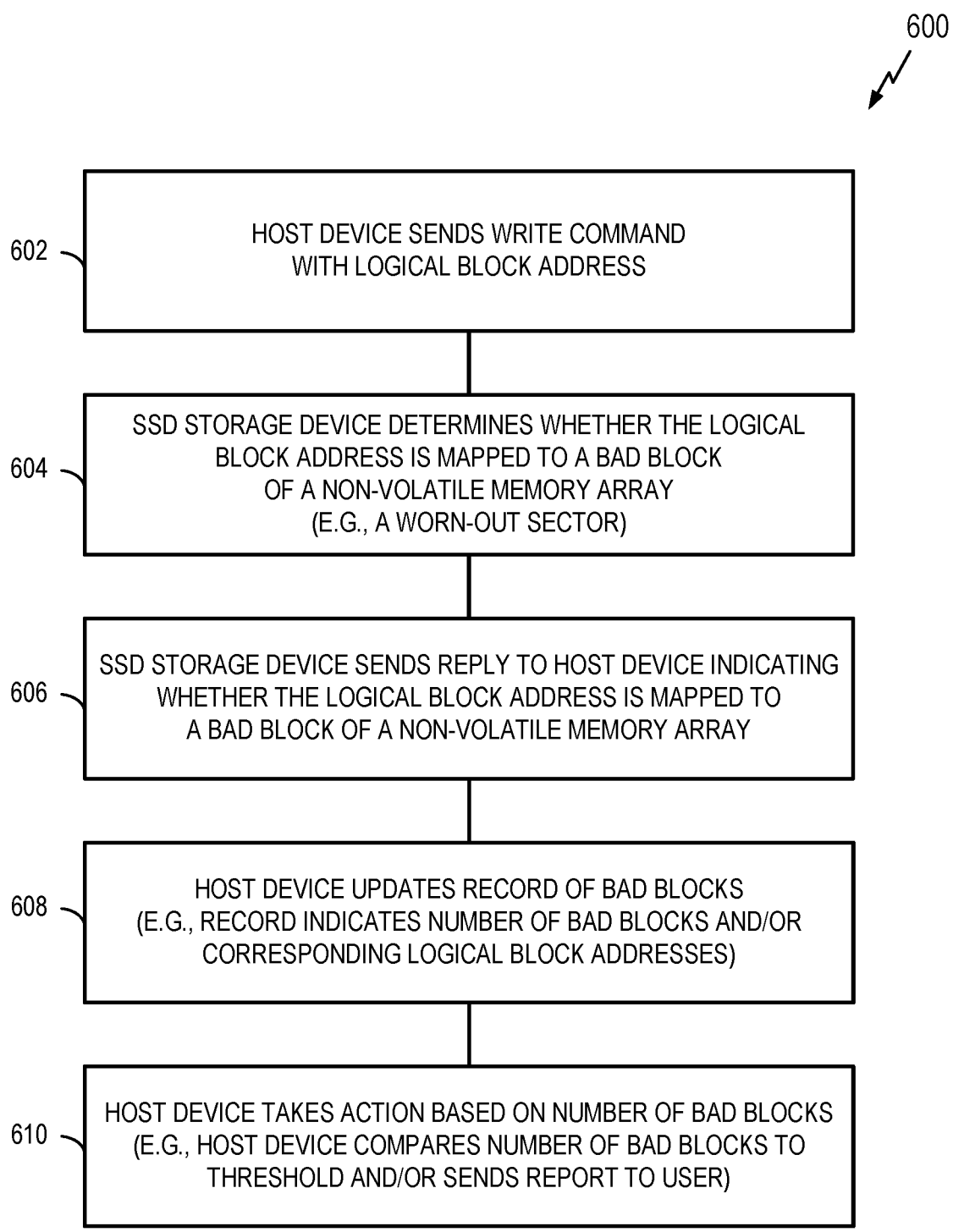
FIG. 6 illustrates an example of operations for determining a quantity of bad physical blocks of a non-volatile memory device in accordance with one or more aspects of the disclosure.

FIG. 6 illustrates another embodiment of operations 600 that may be performed in conjunction with using a write command to determine available physical storage space in accordance with the teachings herein. The operations 600 may take place within one or more of an SSD storage device, a host device, an NVM device, or some other suitable apparatus or apparatuses. For example, one or more of these operations may be performed by the controller 108 (e.g., the module for reporting available NVM storage 114) of FIG. 1. As another example, one or more of these operations may be performed by the host device 102 (e.g., the module for managing reporting of available NVM storage 118) of FIG. 1.

At block 602, a host device (or other suitable apparatus) send a write command with a logical block address to an SSD storage device (or other suitable apparatus).

At block 604, the SSD storage device (or other suitable apparatus) determines whether the logical block address is mapped to a bad block of a non-volatile memory array (e.g., a worn-out sector). For example, the SSD storage device may perform background operations that check the write/read performance of the cells of an NVM device over time.

At block 606, the SSD storage device sends a reply to the host device indicating whether the logical block address is mapped to a bad block of a non-volatile memory array.

At block 608, the host device updates its record of bad blocks. For example, the record (e.g., data set) may indicate the number of bad blocks and/or the logical block addresses that are mapped to the bad blocks.

At block 608, the host device takes action based on the number of bad blocks. For example, the host device may compare the number of bad blocks to a threshold and/or send a report to a user (e.g., where the report it based on the number of bad blocks and/or the comparison).

The operations 600 will be repeated over time to provide up-to-date reports on the available physical storage space. In some aspects, a process in accordance with the teachings herein may include any combination of the above operations.

Example SSD Storage Device

Figure 7:
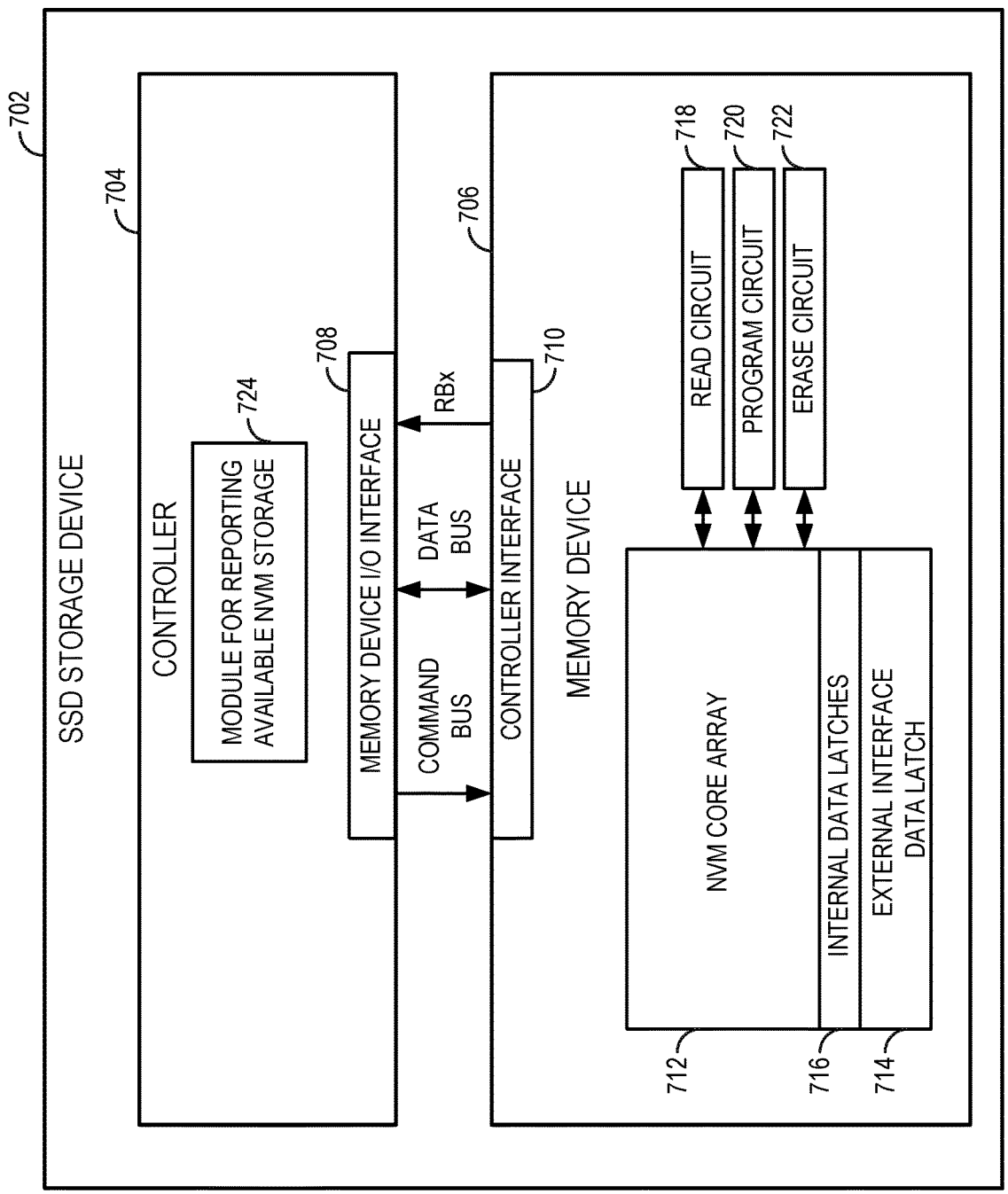
FIG. 7 illustrates an example SSD storage device configured in accordance with one or more aspects of the disclosure.

FIG. 7 illustrates an embodiment of an SSD storage device 702 that may report available physical storage space as taught herein. The SSD storage device 702 includes a controller 704 that writes data to and reads data from a memory device 706 (e.g., an NVM), and performs other associated data storage operations.

The controller 704 and the memory device 706 communicate with one another via corresponding interfaces. The controller 704 includes a memory device input/output (I/O) interface 708 for sending commands to the memory device (e.g., via a command bus), sending data to and receiving data from the memory device 706 (e.g., via a data bus), and for sending and receiving other signaling as applicable (e.g., a read/busy indication (RBx) generated by the memory device 706). Similarly, the memory device 706 includes a controller interface 710 for receiving commands from the controller 704 (e.g., via a command bus), sending data to and receiving data from the controller 704 (e.g., via a data bus), and for sending and receiving other signaling as applicable (e.g., RBx).

The memory device 706 includes an NVM core array 712 for storing data, an external interface data latch 714 for outputting stored data to and receiving data to be stored from the controller interface 710, and a set of internal data latches 716 for storing operational data that is used by the memory device 706. The memory device 706 also includes a read circuit 718 for reading data from the multi-tier NVM core array 712, a program circuit 720 for writing data to the multi-tier NVM core array 712, and an erase circuit 722 for erasing data in the multi-tier NVM core array 712.

In accordance with the teachings herein, the controller 704 includes a module for reporting available NVM storage 724 that may be configured to perform one or more of the operations described herein. For example, the module for reporting available NVM storage 724 may correspond to the module for reporting available NVM storage 114 of FIG. 1 and perform one or more of the reporting-related operations described herein in conjunction with FIGS. 1-6 and 9-11.

Example Host Device

Figure 8:
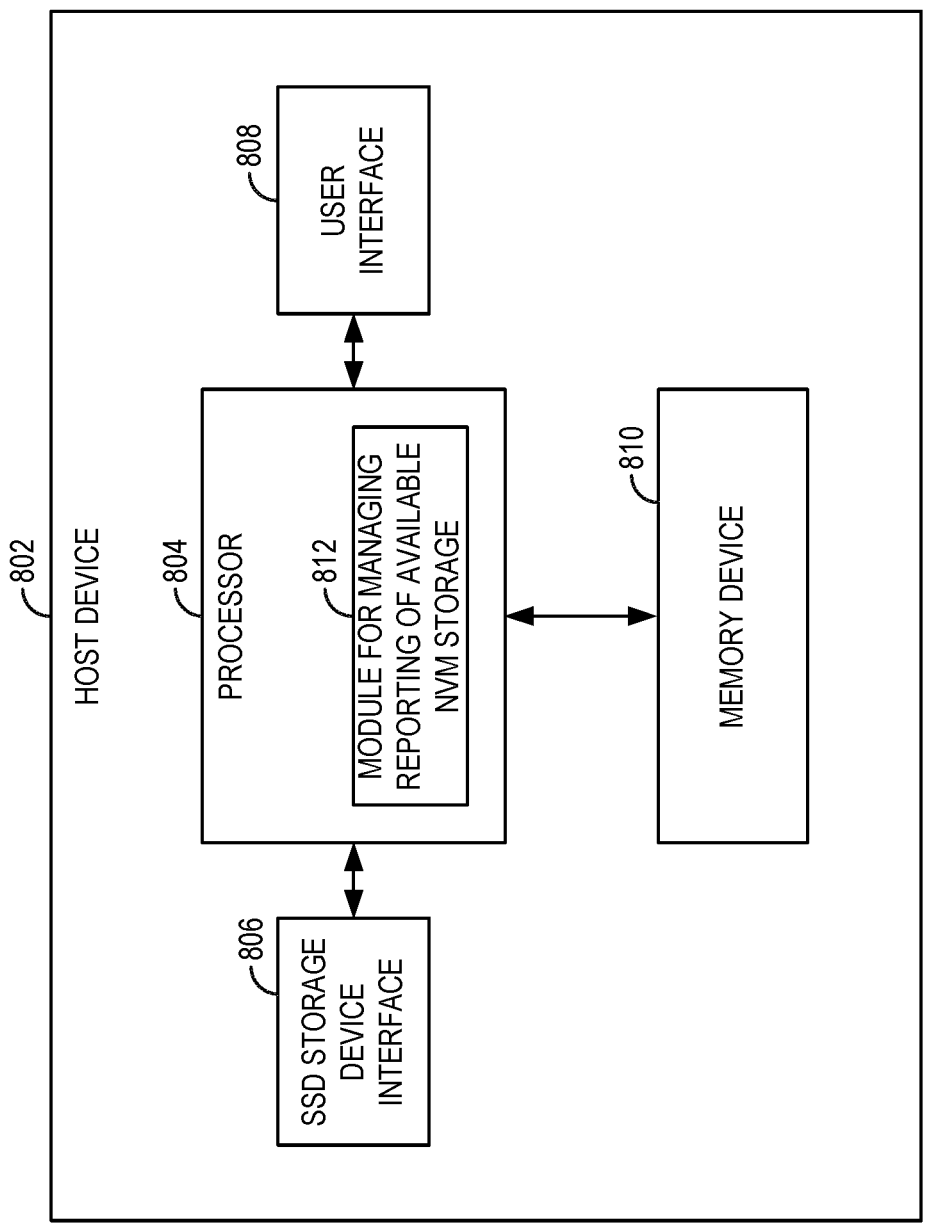
FIG. 8 illustrates an example host device configured in accordance with one or more aspects of the disclosure.

FIG. 8 illustrates an embodiment of a host device 802 that may manage the reporting of available physical storage space as taught herein. The host device 802 includes a processor 804 for issuing write commands, read command, and other commands to an SSD storage device (or other suitable NVM-based memory device), for sending data to and receiving data from the SSD storage device, and for performing other associated data storage operations. The processor 804 communicates with the SSD storage device (not shown) via an SSD storage device interface 806. The processor 804 includes a user interface 808 (e.g., an input/output (I/O) interface) for receiving instructions, write data, etc., from a user and for sending responses, read data, etc., to a user (not shown). The processor 804 also includes a memory device for storing information related to the operations of the host device 802.

In accordance with the teachings herein, the host device 802 includes a module for managing reporting or available NVM storage 812 that may be configured to perform one or more of the operations described herein. For example, the module for managing reporting or available NVM storage 812 may correspond to the module for managing reporting or available NVM storage 118 of FIG. 1 and perform one or more of the reporting-related operations described herein in conjunction with FIGS. 1-6 and 12-14.

First Example Apparatus

Figure 9:
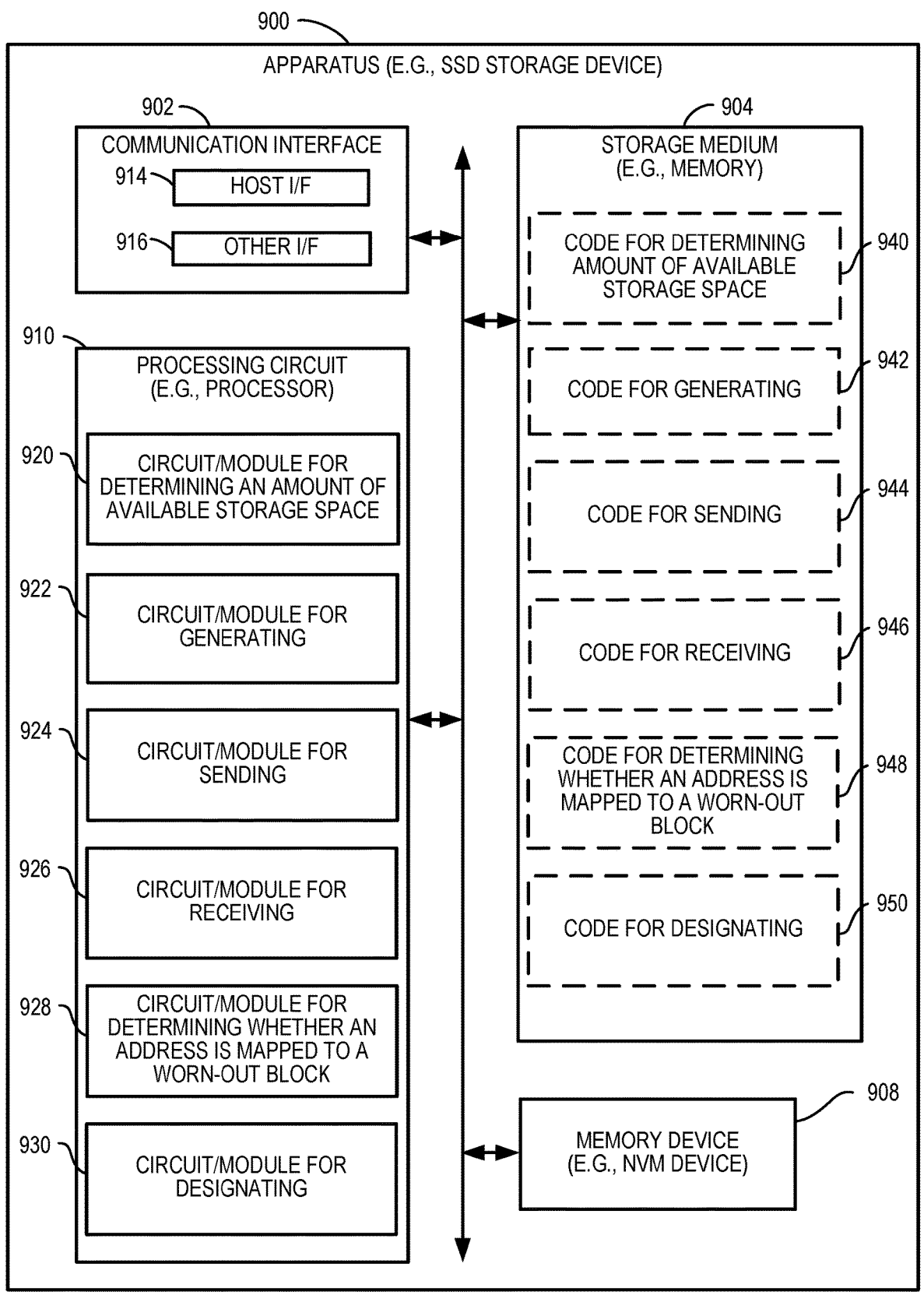
FIG. 9 illustrates an example hardware implementation for an apparatus (e.g., an electronic device) for controlling data storage in accordance with one or more aspects of the disclosure.

FIG. 9 illustrates an embodiment of an apparatus 900 configured to communicate according to one or more aspects of the disclosure. The apparatus 900 could embody or be implemented within an SSD storage device, a memory controller, a solid state drive, a host device, an NVM device, a NAND die, or some other type of device that supports data storage. In various implementations, the apparatus 900 could embody or be implemented within a computing device, a personal computer, a portable device, or workstation, a server, a personal digital assistant, a digital camera, a digital phone, an entertainment device, a medical device, or any other electronic device that stores data.

The apparatus 900 includes a communication interface 902, a storage medium 904, a memory device (e.g., an NVM device) 908, and a processing circuit 910 (e.g., at least one processor and/or other suitable circuitry). These components can be coupled to and/or placed in electrical communication with one another via a signaling bus or other suitable component, represented generally by the connection lines in FIG. 9. The signaling bus may include any number of interconnecting buses and bridges depending on the specific application of the processing circuit 910 and the overall design constraints. The signaling bus links together various circuits such that each of the communication interface 902, the storage medium 904, and the memory device 908 are coupled to and/or in electrical communication with the processing circuit 910. The signaling bus may also link various other circuits (not shown) such as timing sources, peripherals, voltage regulators, and power management circuits, which are well known in the art, and therefore, will not be described any further.

The communication interface 902 provides a means for communicating with other apparatuses over a transmission medium. In some implementations, the communication interface 902 includes circuitry and/or programming (e.g., a program) adapted to facilitate the communication of information bi-directionally with respect to one or more devices in a system. In some implementations, the communication interface 902 may be configured for wire-based communication. For example, the communication interface 902 could be a bus interface, a send/receive interface, or some other type of signal interface including drivers, buffers, or other circuitry for outputting and/or obtaining signals (e.g., outputting signal from and/or receiving signals into an integrated circuit). The communication interface 902 serves as one example of a means for receiving and/or a means for transmitting. In some implementations, the communication interface 902 may be configured for wireless communication. In some implementations, the communication interface includes a host interface 914. In some implementations, the communication interface may include at least one other interface 916. For example, the communication interface 902 may include at least one radio frequency (RF) receiver and/or RF transmitter (e.g., collectively an RF transceiver).

The memory device 908 may represent one or more memory devices. As indicated, the memory device 908 may maintain mapping information 918 along with other information used by the apparatus 900. In some implementations, the memory device 908 and the storage medium 904 are implemented as a common memory component. The memory device 908 may also be used for storing data that is manipulated by the processing circuit 910 or some other component of the apparatus 900.

The storage medium 904 may represent one or more computer-readable, machine-readable, and/or processor-readable devices for storing programming, such as processor executable code or instructions (e.g., software, firmware), electronic data, databases, or other digital information. The storage medium 904 may also be used for storing data that is manipulated by the processing circuit 910 when executing programming. The storage medium 904 may be any available media that can be accessed by a general purpose or special purpose processor, including portable or fixed storage devices, optical storage devices, and various other mediums capable of storing, containing or carrying programming.

By way of example and not limitation, the storage medium 904 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 904 may be embodied in an article of manufacture (e.g., a computer program product). By way of example, a computer program product may include a computer-readable medium in packaging materials. In view of the above, in some implementations, the storage medium 904 may be a non-transitory (e.g., tangible) storage medium. For example, the storage medium 904 may be a non-transitory computer-readable medium storing computer-executable code, including code to perform operations as described herein.

The storage medium 904 may be coupled to the processing circuit 910 such that the processing circuit 910 can read information from, and write information to, the storage medium 904. That is, the storage medium 904 can be coupled to the processing circuit 910 so that the storage medium 904 is at least accessible by the processing circuit 910, including examples where at least one storage medium is integral to the processing circuit 910 and/or examples where at least one storage medium is separate from the processing circuit 910 (e.g., resident in the apparatus 900, external to the apparatus 900, distributed across multiple entities, etc.).

Programming stored by the storage medium 904, when executed by the processing circuit 910, causes the processing circuit 910 to perform one or more of the various functions and/or process operations described herein. For example, the storage medium 904 may include operations configured for regulating operations at one or more hardware blocks of the processing circuit 910, as well as to utilize the communication interface 902 for wireless communication utilizing their respective communication protocols.

The processing circuit 910 is generally adapted for processing, including the execution of such programming stored on the storage medium 904. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 910 is arranged to obtain, process and/or send data, control data access and storage, issue commands, and control other desired operations. The processing circuit 910 may include circuitry configured to implement desired programming provided by appropriate media in at least one example. For example, the processing circuit 910 may be implemented as one or more processors, one or more controllers, and/or other structure configured to execute executable programming Examples of the processing circuit 910 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 910 may also be implemented as a combination of computing components, such as a combination of a controller and a microprocessor, a number of microprocessors, one or more microprocessors in conjunction with an ASIC and a microprocessor, or any other number of varying configurations. These examples of the processing circuit 910 are for illustration and other suitable configurations within the scope of the disclosure are also contemplated.

According to one or more aspects of the disclosure, the processing circuit 910 may be adapted to perform any or all of the features, processes, functions, operations and/or routines for any or all of the apparatuses described herein. For example, the processing circuit 910 may be configured to perform any of the steps, functions, and/or processes described with respect to FIGS. 1-6, 10, and 11. As used herein, the term "adapted" in relation to the processing circuit 910 may refer to the processing circuit 910 being one or more of configured, employed, implemented, and/or programmed to perform a particular process, function, operation and/or routine according to various features described herein.

The processing circuit 910 may be a specialized processor, such as an application-specific integrated circuit (ASIC) that serves as a means for (e.g., structure for) carrying out any one of the operations described in conjunction with FIGS. 1-6, 10, and 11. The processing circuit 910 serves as one example of a means for sending and/or a means for receiving. In various implementations, the processing circuit 910 may provide and/or incorporate, at least in part, the functionality described above for the controller 108 or the SSD storage device 104 of FIG. 1 or the controller 704 or the SSD storage device 702 of FIG. 7.

According to at least one example of the apparatus 900, the processing circuit 910 may include one or more of a circuit/module for determining an amount of available storage space 920, a circuit/module for generating 922, a circuit/module for sending 924, a circuit/module for receiving 926, a circuit/module for determining whether an address is mapped to a worn-out block 928, or a circuit/module for designating 930. In various implementations, the circuit/module for determining an amount of available storage space 920, the circuit/module for generating 922, the circuit/module for sending 924, the circuit/module for receiving 926, the circuit/module for determining whether an address is mapped to a worn-out block 928, or the circuit/module for designating 930 may provide and/or incorporate, at least in part, the functionality described above for the controller 108 or the SSD storage device 104 of FIG. 1 or the controller 704 or the SSD storage device 702 of FIG. 7.

As mentioned above, a program stored by the storage medium 904, when executed by the processing circuit 910, causes the processing circuit 910 to perform one or more of the various functions and/or process operations described herein. For example, the program may cause the processing circuit 910 to perform the various functions, steps, and/or processes described herein with respect to FIGS. 1-6, 10, and 11 in various implementations. As shown in FIG. 9, the storage medium 904 may include one or more of code for determining an amount of available storage space 940, code for generating 942, code for sending 944, code for receiving 946, code for determining whether an address is mapped to a worn-out block 948, or code for designating 950. In various implementations, the code for determining an amount of available storage space 940, the code for generating 942, the code for sending 944, the code for receiving 946, code for determining whether an address is mapped to a worn-out block 948, or the code for designating 950 may be executed or otherwise used to provide the functionality described herein for the circuit/module for determining an amount of available storage space 920, the circuit/module for generating 922, the circuit/module for sending 924, the circuit/module for receiving 926, the circuit/module for determining whether an address is mapped to a worn-out block 928, or the circuit/module for designating 930.

First Example Process

Figure 10:
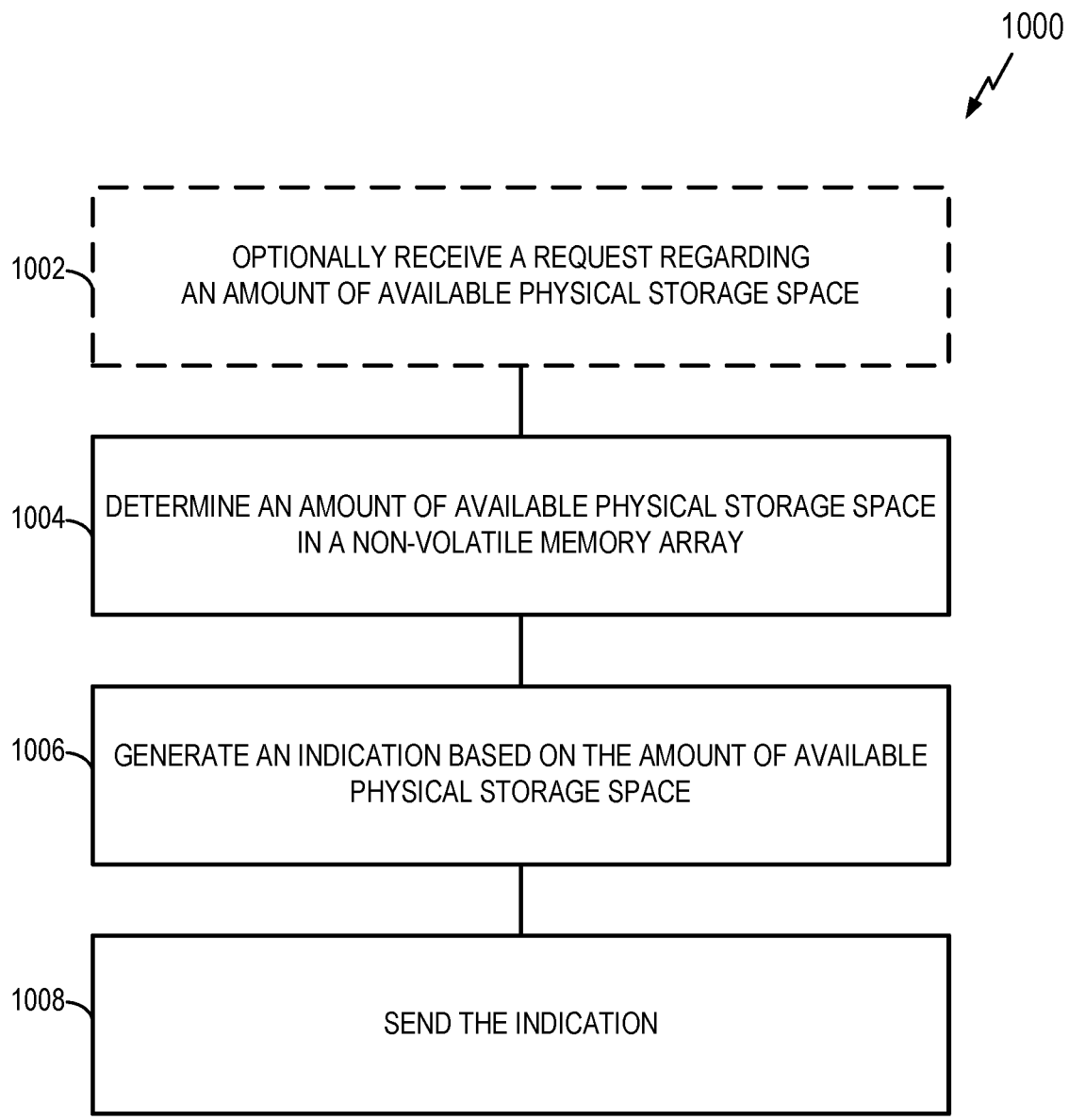
FIG. 10 illustrates an example process for reporting an amount of available physical storage space of a non-volatile memory device in accordance with one or more aspects of the disclosure.

FIG. 10 illustrates a process 1000 for communication in accordance with some aspects of the disclosure. The process 1000 may take place within a processing circuit (e.g., the processing circuit 910 of FIG. 9), which may be located in a controller, an SSD storage device, a host device, an NVM device, a NAND die, or some other suitable apparatus. Of course, in various aspects within the scope of the disclosure, the process 1000 may be implemented by any suitable apparatus capable of supporting memory-related operations.

At optional block 1002, an apparatus (e.g., a controller of a solid state drive) may receive a request regarding an amount of available physical storage space. For example, a solid state drive may receive a request for a report from a host device.

At block 1004, the apparatus determines the amount of available physical storage space in a non-volatile memory array (e.g., the memory device 908). In some aspects, the amount of available physical storage space may be based on a total amount of physical storage space, a first amount of storage space comprising used blocks (e.g., a first amount of storage space within which valid data is stored), and a second amount of storage space comprising worn-out blocks (e.g., a second amount of storage space that is designated as worn-out). In some aspects, the amount of available physical storage space may be further based on a third amount of storage space comprising reserved blocks (e.g., a third amount of storage space that is designated as being reserved for use by the apparatus). In some aspects, the determination of the amount of available physical storage space may include: subtracting the first amount of storage space, the second amount of storage space, and the third amount of storage space from the total amount of physical storage space of the non-volatile memory array.

In some aspects, the determination of the amount of available physical storage space may be triggered based on a timer of the apparatus. In some aspects, the determination of the amount of available physical storage space may be triggered by the request of block 1002.

At block 1006, the apparatus generates an indication based on the amount of available physical storage space. In some aspects, the indication may indicate that the amount of available physical storage space is less than or equal to a threshold. In some aspects, the indication may indicate the amount of available physical storage space. In some aspects, the generation of the indication may include: comparing the amount of available physical storage space with a threshold; and setting the indication based on the comparison.

In some aspects, the generation of the indication may include: determining an amount of write data associated with at least one pending write command in a command queue of the apparatus; comparing the amount of available physical storage space with the amount of write data; and setting the indication based on the comparison. In some aspects, the indication may indicate that the apparatus does not have sufficient data storage space for servicing the at least one pending write command.

At block 1008, the apparatus sends the indication generates at block 1006 (e.g., to the host device).

In some aspects, a process in accordance with the teachings herein may include any combination of the above operations.

Second Example Process

Figure 11:
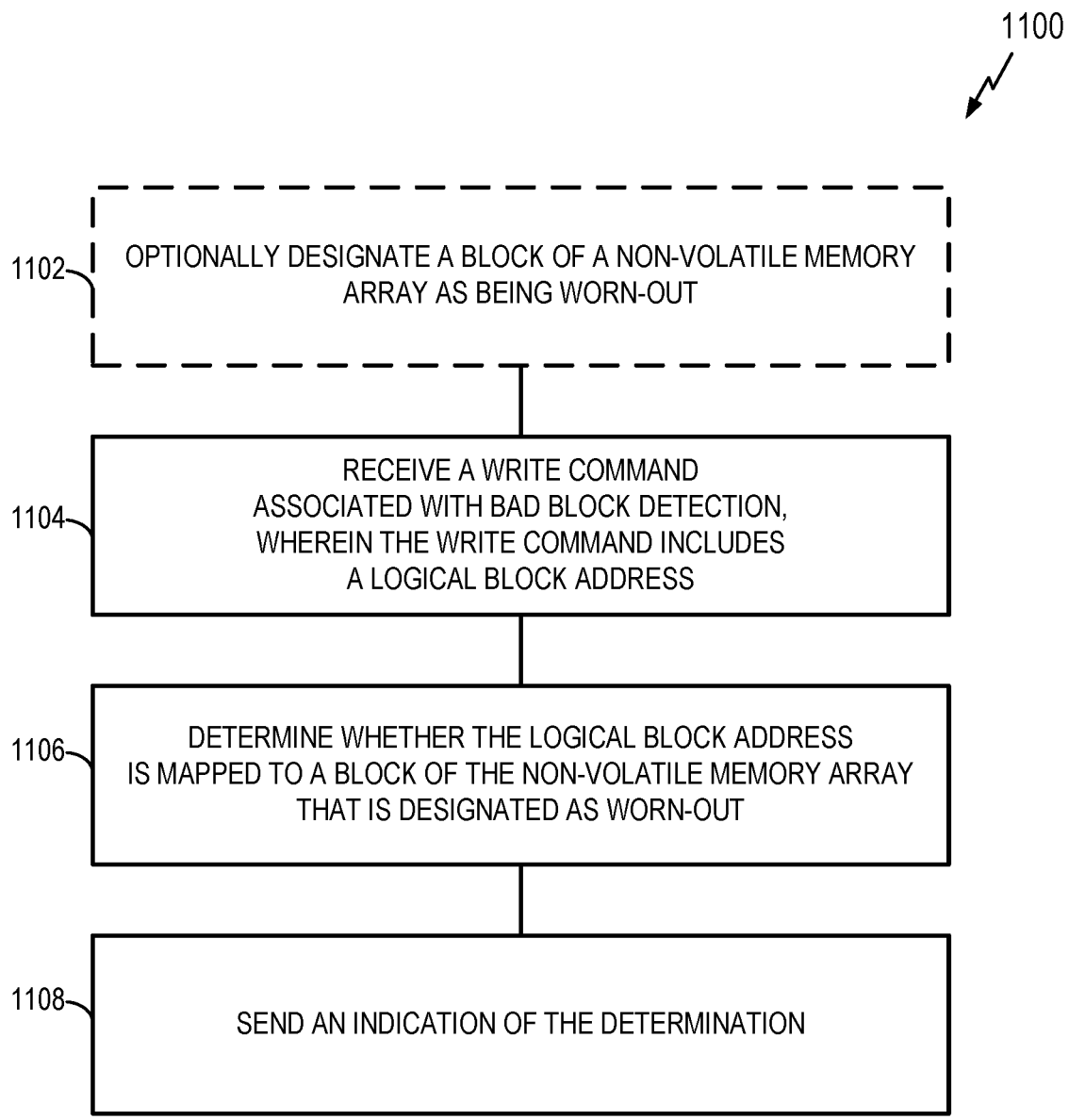
FIG. 11 illustrates an example process for determining a quantity of bad physical blocks of a non-volatile memory device in accordance with one or more aspects of the disclosure.

FIG. 11 illustrates a process 1100 for communication in accordance with some aspects of the disclosure. The process 1100 may take place within a processing circuit (e.g., the processing circuit 910 of FIG. 9), which may be located in an SSD storage device, a controller, an NVM device, a NAND die, a host device, or some other suitable apparatus. Of course, in various aspects within the scope of the disclosure, the process 1100 may be implemented by any suitable apparatus capable of supporting memory-related operations.

At block 1102, an apparatus (e.g., a controller of a solid state drive) may designate a block of non-volatile memory as being worn-out. In some aspects, the designation may be based on whether at least one portion of the block of the non-volatile memory array can be written without error.

At block 1104, the apparatus receives a write command associated with bad block detection. For example, a solid state drive may receive the write command from a host device. The write command may include at least one logical block address.

At block 1106, the apparatus determines whether the logical block address is mapped to a block of the non-volatile memory array that is designated as worn-out.

At block 1108, the apparatus sends an indication of the determination (e.g., to the host device). In some aspects, the indication may indicate that the logical block address is mapped to a worn-out physical address block.

In some aspects, a process in accordance with the teachings herein may include any combination of the above operations.

Second Example Apparatus

Figure 12:
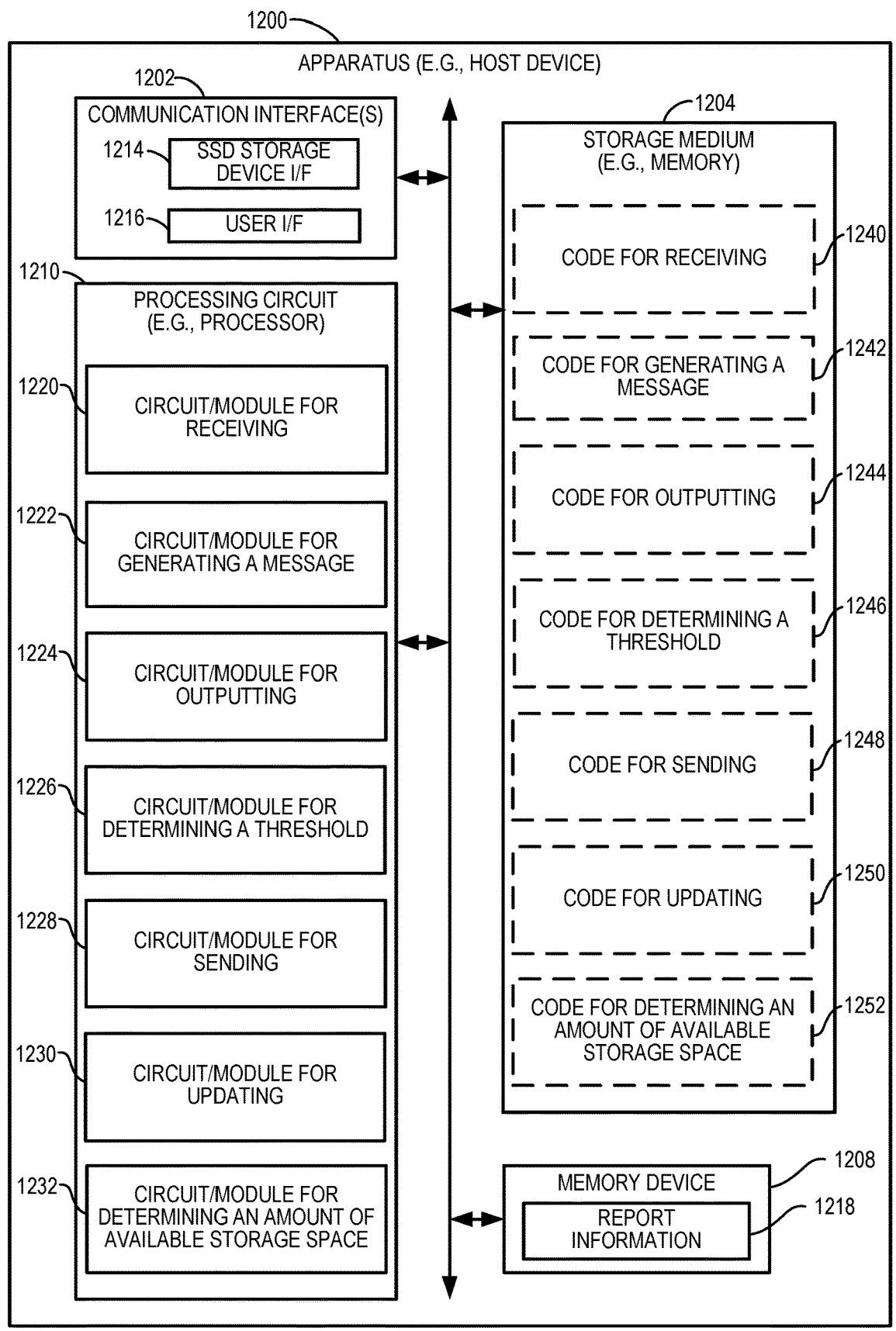
FIG. 12 illustrates an example hardware implementation for an apparatus (e.g., an electronic device) for storing data in accordance with one or more aspects of the disclosure.

FIG. 12 illustrates an embodiment of an apparatus 1200 configured to communicate according to one or more aspects of the disclosure. The apparatus 1200 could embody or be implemented within a host device, a controller, an SSD storage device, or some other type of device that uses data storage. In various implementations, the apparatus 1200 could embody or be implemented within a computing device, a personal computer, a portable device, or workstation, a server, a personal digital assistant, a digital camera, a digital phone, an entertainment device, a medical device, or any other electronic device that stores data.

The apparatus 1200 includes a communication interface 1202, a storage medium 1204, a user interface 1206, a memory device 1208 (e.g., storing report information 1218), and a processing circuit 1210 (e.g., at least one processor and/or other suitable circuitry). In various implementations, the user interface 1206 may include one or more of: a keypad, a display, a speaker, a microphone, a touchscreen display, of some other circuitry for receiving an input from or sending an output to a user. In some implementations, the communication interface 1202 includes an SSD storage device interface 1214. In some implementations, the communication interface 1202 may include a user interface 1216. In some implementations, the communication interface 1202 may include at least one other interface. For example, the communication interface 1202 may include at least one radio frequency (RF) receiver and/or RF transmitter (e.g., collectively an RF transceiver). In general, the components of FIG. 12 may be similar to corresponding components of the apparatus 900 of FIG. 9.

According to one or more aspects of the disclosure, the processing circuit 1210 may be adapted to perform any or all of the features, processes, functions, operations and/or routines for any or all of the apparatuses described herein. For example, the processing circuit 1210 may be configured to perform any of the steps, functions, and/or processes described with respect to FIGS. 1-6, 13, and 14. As used herein, the term "adapted" in relation to the processing circuit 1210 may refer to the processing circuit 1210 being one or more of configured, used, implemented, and/or programmed to perform a particular process, function, operation and/or routine according to various features described herein.

The processing circuit 1210 may be a specialized processor, such as an application-specific integrated circuit (ASIC) that serves as a means for (e.g., structure for) carrying out any one of the operations described in conjunction with FIGS. 1-6, 13, and 14. The processing circuit 1210 serves as one example of a means for sending and/or a means for receiving. In various implementations, the processing circuit 1210 may provide and/or incorporate, at least in part, the functionality described above for the module for managing reporting of available NVM storage 128 or the host device 102 of FIG. 1 or the processor 804 or the host device 802 of FIG. 8.

According to at least one example of the apparatus 1200, the processing circuit 1210 may include one or more of a circuit/module for receiving 1220, a circuit/module for generating a message 1222, a circuit/module for outputting 1224, a circuit/module for determining a threshold 1226, a circuit/module for sending 1228, a circuit/module for updating 1230, or a circuit/module for determining an amount of available storage space 1232. In various implementations, the circuit/module for receiving 1220, the circuit/module for generating a message 1222, the circuit/module for outputting 1224, the circuit/module for determining a threshold 1226, the circuit/module for sending 1228, the circuit/module for updating 1230, or the circuit/module for determining an amount of available storage space 1232 may provide and/or incorporate, at least in part, the functionality described above for the module for managing reporting of available NVM storage 118 or the host device 102 of FIG. 1 or the processor 804 or the host device 802 of FIG. 8.

As mentioned above, programming stored by the storage medium 1204, when executed by the processing circuit 1210, causes the processing circuit 1210 to perform one or more of the various functions and/or process operations described herein. For example, the programming may cause the processing circuit 1210 to perform the various functions, steps, and/or processes described herein with respect to FIGS. 1-6, 13, and 14 in various implementations. As shown in FIG. 12, the storage medium 1204 may include one or more of code for receiving 1240, code for generating a message 1242, code for outputting 1244, code for determining a threshold 1246, code for sending 1248, code for updating 1250, or code for determining an amount of available storage space 1252. In various implementations, the code for receiving 1240, the code for generating a message 1242, the code for outputting 1244, the code for determining a threshold 1246, the code for sending 1248, the code for updating 1250, or the code for determining an amount of available storage space 1252 may be executed or otherwise used to provide the functionality described herein for the circuit/module for receiving 1220, the circuit/module for generating a message 1222, the circuit/module for outputting 1224, the circuit/module for determining a threshold 1226, the circuit/module for sending 1228, the circuit/module for updating 1230, or the circuit/module for determining an amount of available storage space 1232.

Third Example Process

Figure 13:
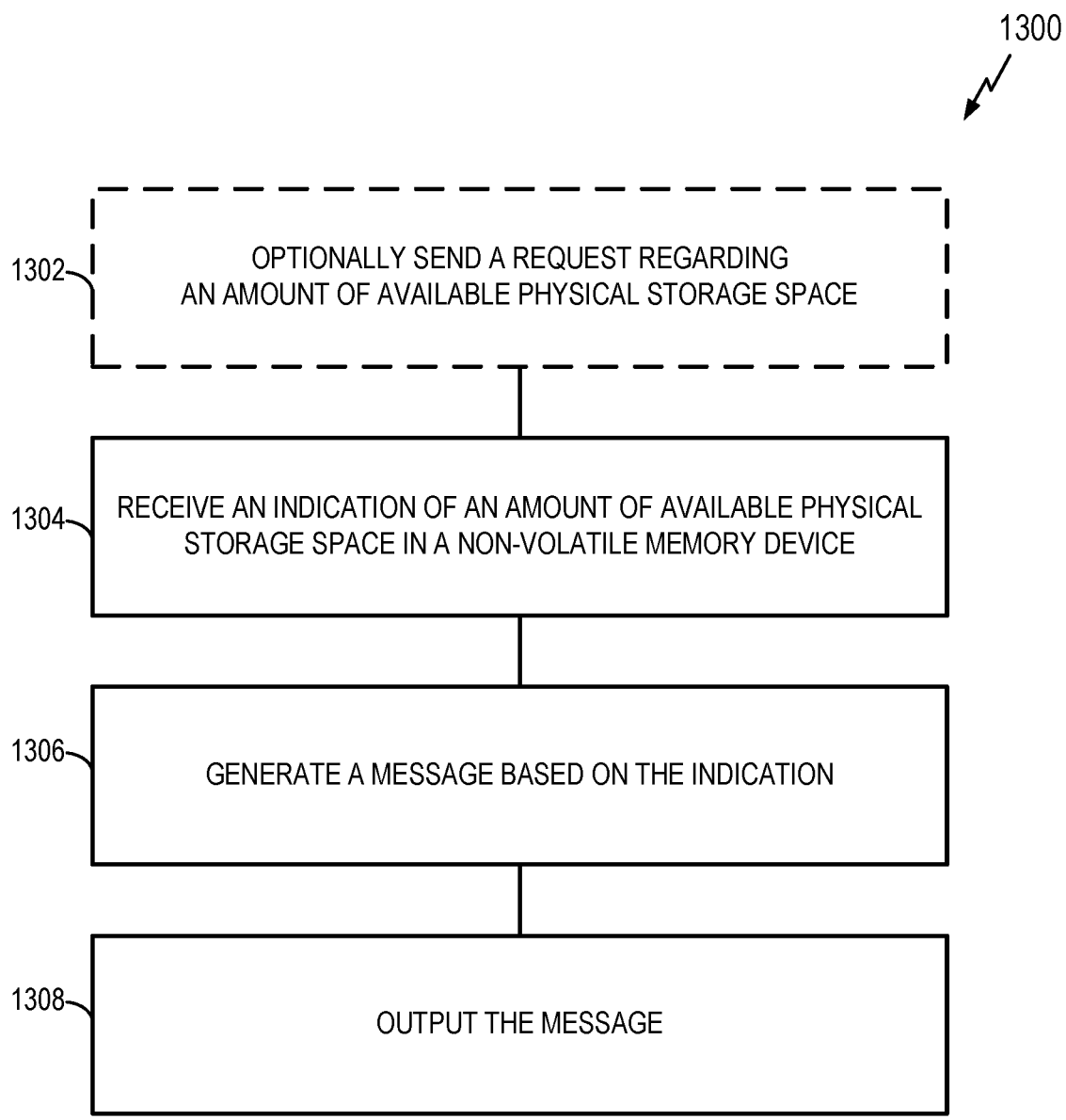
FIG. 13 illustrates an example process for reporting an amount of available physical storage space of a non-volatile memory device in accordance with one or more aspects of the disclosure.

FIG. 13 illustrates a process 1300 for communication in accordance with some aspects of the disclosure. The process 1300 may take place within a processing circuit (e.g., the processing circuit 1210 of FIG. 12), which may be located in a host device, a controller, an SSD storage device, or some other suitable apparatus. Of course, in various aspects within the scope of the disclosure, the process 1300 may be implemented by any suitable apparatus capable of supporting memory-related operations.

At optional block 1302, an apparatus (e.g., a host device) may send a request regarding an amount of available physical storage space. For example, a host device may send a request for a report to a solid state drive.

At block 1304, the apparatus receives an indication of an amount of available physical storage space in a non-volatile memory device (e.g., the memory device 908 of FIG. 9). In some aspects, the amount of available physical storage space may be based on a total amount of physical storage space, a first amount of storage space comprising used blocks (e.g., a first amount of storage space within which valid data is stored), and a second amount of storage space comprising worn-out blocks (e.g., a second amount of storage space that is designated as worn-out). In some aspects, the amount of available physical storage space may be further based on a third amount of storage space comprising reserved blocks (e.g., a third amount of storage space that is designated as being reserved for use by the apparatus).

In some aspects, the indication may indicate that the amount of available physical storage space is less than or equal to a threshold. In some aspects, the process 1300 may further include determining the threshold and sending the threshold to a non-volatile memory device (e.g., via a device interface).

In some aspects, the process 1300 may include determining the threshold based on a performance requirement. In this case, the process may further include sending the threshold to the non-volatile memory device.

In some aspects, the process 1300 may include sending at least one write command to a non-volatile memory device (e.g., via a device interface). In this case, the indication may be received at block 1302 after the at least one write command is sent (e.g., the indication may be a response to the write command) In some aspects, the indication may indicate that the non-volatile memory device does not have sufficient data storage space for servicing the at least one write command.

At block 1306, the apparatus generates a message (e.g., an alert message) based on the indication of block 1304. In some aspects, the message may indicate that the amount of available physical storage space is less than or equal to a threshold. In some aspects, the message may indicate the amount of available physical storage space.

At block 1308, the apparatus outputs the message (e.g., via a user interface).

In some aspects, a process in accordance with the teachings herein may include any combination of the above operations.

Fourth Example Process

Figure 14:
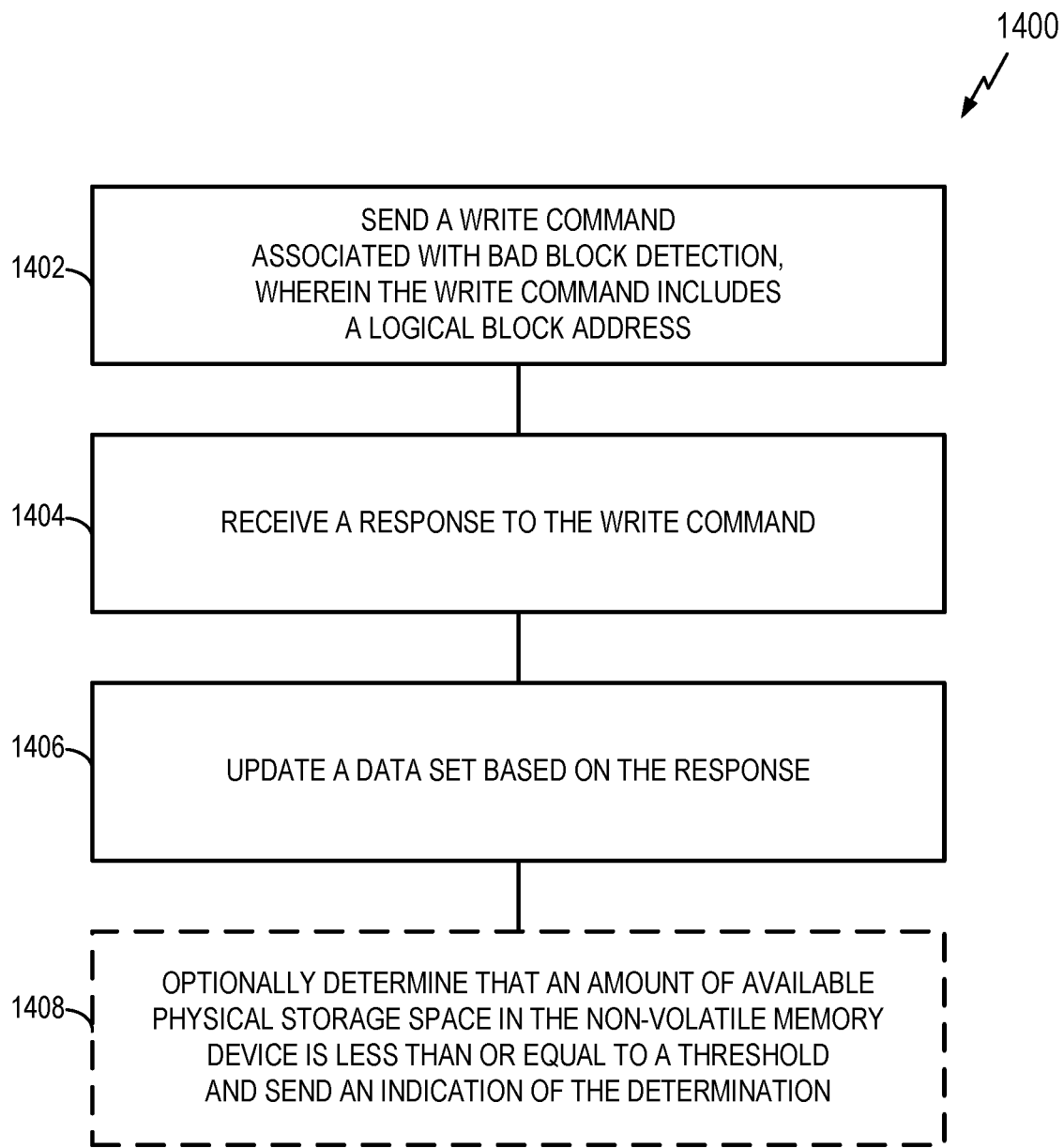
FIG. 14 illustrates an example process for determining a quantity of bad physical blocks of a non-volatile memory device in accordance with one or more aspects of the disclosure.

FIG. 14 illustrates a process 1400 for communication in accordance with some aspects of the disclosure. The process 1400 may take place within a processing circuit (e.g., the processing circuit 1210 of FIG. 12), which may be located in a host device, a controller, an SSD storage device, or some other suitable apparatus. Of course, in various aspects within the scope of the disclosure, the process 1400 may be implemented by any suitable apparatus capable of supporting memory-related operations.

At block 1402, an apparatus (e.g., a host device) sends a write command associated with bad block detection. For example, the host device may send the write command to a solid state drive. The write command may include at least one logical block address.

At block 1404, the apparatus receives a response to the write command (e.g., from the solid state drive). In some aspects, the response may indicate whether the at least one logical block address is mapped to at least one worn-out physical block.

At block 1406, the apparatus updates a data set based on the response received at block 1404. In some aspects, the updating of the data set may involve including in the data set an identifier of each logical block address of the quantity of logical block addresses that is mapped to a corresponding one of the worn-out physical block addresses.

At optional block 1408, the apparatus may determine that an amount of available physical storage space in the non-volatile memory device is less than or equal to a threshold. In some aspects, this determination may be based on the quantity of logical block addresses that are mapped to the worn-out physical block addresses. In this case, the process 1300 may further include sending an indication of the determination of block 1408 (e.g., via a user interface).

In some aspects, a process in accordance with the teachings herein may include any combination of the above operations.

Additional Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage apparatus, comprising:
a non-volatile memory array;
an interface; and
a processor coupled to the non-volatile memory array and the interface and configured to:
determine an amount of available physical storage space in the non-volatile memory array, wherein the amount of available physical storage space is based on a total amount of physical storage space, a first amount of storage space comprising used blocks, and a second amount of storage space comprising worn-out blocks,
determine an amount of write data associated with a pending write command in a command queue of the apparatus,
compare the amount of available physical storage space with the amount of write data,
generate an indication based on the comparison, wherein the indication indicates that the apparatus does not have sufficient data storage space for servicing the pending write command, and
send the indication to a host device via the interface thereby allowing the processor to take action to prevent the data storage apparatus from switching to a read-only mode of operation.

2. The apparatus of claim 1, wherein the indication further indicates that the amount of available physical storage space is less than or equal to a threshold.

3. The apparatus of claim 1, wherein the indication further indicates the amount of available physical storage space.

4. The apparatus of claim 1, wherein the generation of the indication comprises:
comparing the amount of available physical storage space with a threshold; and
setting the indication based on the comparison.

5. The apparatus of claim 4, wherein the determination of the amount of available physical storage space is triggered based on a timer of the apparatus.

6. The apparatus of claim 4, wherein:
the processor is further configured to receive a request regarding the amount of available physical storage space; and
the determination of the amount of available physical storage space is triggered by the request.

7. The apparatus of claim 1, wherein the amount of available physical storage space is further based on a third amount of storage space that is designated as being reserved for use by the apparatus.

8. A method for a data storage apparatus, comprising:
determining an amount of available physical storage space in a non-volatile memory array, wherein the amount of available physical storage space is based on a total amount of physical storage space, a first amount of storage space comprising used blocks, a second amount of storage space comprising worn-out blocks, and a third amount of storage space comprising reserved blocks;
determining an amount of write data associated with a pending write command in a command queue of the apparatus;
comparing the amount of available physical storage space with the amount of write data;
generating an indication based on the comparison, wherein the indication indicates that the apparatus does not have sufficient data storage space for servicing the pending write command; and
sending the indication to a host device thereby allowing the apparatus to take action to prevent the apparatus from switching to a read-only mode of operation.

9. The method of claim 8, wherein the generation of the indication comprises:
determining whether the amount of available physical storage space is less than or equal to a threshold amount of storage space; and
setting the indication to further indicate that the amount of available physical storage space is less than or equal to the threshold amount of storage space.

10. The method of claim 9, wherein the determination of the amount of available physical storage space comprises:
subtracting the first amount of storage space, the second amount of storage space, and the third amount of storage space from the total amount of physical storage space.

11. The method of claim 8, further comprising:
receiving a request for a report on the amount of available physical storage space,
wherein the indication is sent in response to the request.

12. The method of claim 8, wherein the indication further indicates that the apparatus does not have sufficient data storage space for servicing a write command.

13. A data storage apparatus, comprising:
means for determining an amount of available physical storage space in a non-volatile memory array, wherein the amount of available physical storage space is based on a total amount of physical storage space, a first amount of storage space comprising used blocks, and a second amount of storage space comprising worn-out blocks;
means for determining an amount of write data associated with a pending write command in a command queue of the apparatus;
means for comparing the amount of available physical storage space with the amount of write data;
means for generating a report based on the comparison, wherein the report indicates that the apparatus does not have sufficient data storage space for servicing the pending write command; and
means for sending the report to a host device thereby allowing the data storage apparatus to take action to prevent the data storage apparatus from switching to a read-only mode of operation.

14. The apparatus of claim 13, wherein:
the generation of the report is based on at least one threshold; and
the apparatus further comprises means for receiving the at least one threshold.

15. A host device for accessing a non-volatile memory device, comprising:
a device interface to the non-volatile memory device; and
a processor coupled to the device interface and configured to:
receive, via the device interface, an indication of an amount of available physical storage space in the non-volatile memory device, wherein the amount of available physical storage space is based on a total amount of physical storage space, a first amount of storage space comprising used blocks, and a second amount of storage space comprising worn-out blocks,
determine, based on the indication, that issuance of a write command to the non-volatile memory device would cause the non-volatile memory device to switch to a read-only mode of operation, and
as a result of the determination that issuance of a write command to the non-volatile memory device would cause the non-volatile memory device to switch to a read-only mode of operation, manage writes issued to the non-volatile memory device to ensure that an amount of data subsequently written to the non-volatile memory device does not exceed the available physical storage space.

16. The host device of claim 15, wherein the indication further indicates that the amount of available physical storage space is less than or equal to a threshold.

17. The host device of claim 16, wherein the processor is further configured to:
determine the threshold; and
send the threshold to the non-volatile memory device via the device interface.

18. The host device of claim 15, wherein:
the processor is further configured to output a message based on the indication; and
the message indicates that the amount of available physical storage space is less than or equal to a threshold.

19. The host device of claim 15, wherein:
the processor is further configured to output a message based on the indication; and
the message indicates the amount of available physical storage space.

20. The host device of claim 15, wherein:
the processor is further configured to send a request regarding the amount of available physical storage space to the non-volatile memory device via the device interface; and
the indication is received after the request is sent.

21. The host device of claim 15, wherein:
the processor is further configured to send at least one write command to the non-volatile memory device via the device interface; and
the indication is received after the at least one write command is sent.

22. The host device of claim 21, wherein the indication further indicates that the non-volatile memory device does not have sufficient data storage space for servicing the at least one write command.

23. The host device of claim 15, wherein the processor is further configured to:
- determine a maximum write size based on the indication; and
- issue write commands to the non-volatile memory device via the device interface based on the determined maximum write size.

24. A method at a host device for of accessing a non-volatile memory device, comprising:
- receiving an indication of an amount of available physical storage space in the non-volatile memory device, wherein the amount of available physical storage space is based on a total amount of physical storage space, a first amount of storage space comprising used blocks, and a second amount of storage space comprising worn-out blocks;
- determining, based on the indication, that issuance of a write command to the non-volatile memory would cause the non-volatile memory to switch to a read-only mode of operation; and
- as a result of the determination that issuance of a write command to the non-volatile memory device would cause the non-volatile memory device to switch to a read-only mode of operation, managing writes issued to the non-volatile memory device to ensure that an amount of data subsequently written to the non-volatile memory device does not exceed the available physical storage space.

* * * * *